US011752622B2

(12) United States Patent
Graham et al.

(10) Patent No.: US 11,752,622 B2
(45) Date of Patent: Sep. 12, 2023

(54) EXTENSION TOOL HAVING A PLURALITY OF LINKS

(71) Applicants: General Electric Company, Schenectady, NY (US); Oliver Crispin Robotics Limited, Altrincham (GB)

(72) Inventors: Andrew Crispin Graham, Badminton (GB); Tim Henri Ann Francois, Emersons Green (GB); Hendrik Pieter Jacobus de Bock, Clifton Park, NY (US); Michael Robert Millhaem, Cincinnati, OH (US)

(73) Assignees: General Electric Company, Schenectady, NY (US); Oliver Crispin Robotics Limited, Altrincham (GB)

( * ) Notice: Subject to any disclaimer, the term of this patent is extended or adjusted under 35 U.S.C. 154(b) by 386 days.

(21) Appl. No.: 16/750,665

(22) Filed: Jan. 23, 2020

(65) Prior Publication Data

US 2021/0229269 A1     Jul. 29, 2021

(51) Int. Cl.
*B25J 9/10* (2006.01)
*B25J 9/14* (2006.01)
*B25J 18/02* (2006.01)
*B25J 18/06* (2006.01)
*B25F 5/00* (2006.01)

(52) U.S. Cl.
CPC ............... *B25J 9/106* (2013.01); *B25F 5/005* (2013.01); *B25J 9/14* (2013.01); *B25J 18/02* (2013.01); *B25J 18/06* (2013.01)

(58) Field of Classification Search
CPC ..... B25J 9/106; B25J 9/14; B25J 18/02; B25J 18/06; B25F 5/005
See application file for complete search history.

(56) References Cited

U.S. PATENT DOCUMENTS

| 338,310 A | 3/1886 | Smith |
| 1,774,986 A | 9/1930 | Mackenzie |
| 1,987,972 A | 1/1935 | Rhein et al. |
| 2,073,903 A | 3/1937 | O'Neil |
| 2,510,198 A | 6/1950 | Tesmer |
| 2,974,676 A | 3/1961 | Hagelthorn |
| 3,096,962 A | 7/1963 | Meijs |

(Continued)

FOREIGN PATENT DOCUMENTS

| CA | 2960352 A1 | 9/2017 |
| CA | 3077622 A1 | 4/2019 |

(Continued)

OTHER PUBLICATIONS

FET20 (Wireless Borescope, Klein Tools, Jan. 2019) (Year: 2019).

(Continued)

*Primary Examiner* — Terence Boes
(74) *Attorney, Agent, or Firm* — Fitch, Even, Tabin & Flannery LLP

(57) ABSTRACT

An extension tool includes a plurality of sequentially arranged links moveable to a first position, the plurality of sequentially arranged links rigidly fixed to one another in the first position, the plurality of sequentially arranged links defining a first passage and a second passage, the second passage being separate from the first passage when the plurality of sequentially arranged links are rigidly fixed to one another.

18 Claims, 11 Drawing Sheets

(56) References Cited

U.S. PATENT DOCUMENTS

| | | |
|---|---|---|
| 3,190,286 A | 6/1965 | Stokes |
| 3,266,059 A | 8/1966 | Stelle |
| 3,270,641 A | 9/1966 | Gosselin |
| 3,583,393 A | 6/1971 | Takahashi |
| 3,625,084 A | 12/1971 | Siebert |
| 3,778,170 A | 12/1973 | Howell |
| 4,035,137 A | 7/1977 | Arand |
| 4,041,695 A | 8/1977 | Harper |
| 4,095,418 A | 6/1978 | Mansson et al. |
| 4,170,489 A | 10/1979 | Magnus et al. |
| 4,227,584 A | 10/1980 | Driver |
| 4,242,863 A | 1/1981 | Bailey |
| 4,483,326 A | 11/1984 | Yamaka |
| 4,625,936 A | 12/1986 | Hadden, Sr. |
| 4,651,718 A | 3/1987 | Collins |
| 4,703,888 A | 11/1987 | Kawamura et al. |
| 4,713,120 A | 12/1987 | Hodgens, II et al. |
| 4,730,960 A | 3/1988 | Lewis |
| 4,773,395 A | 9/1988 | Suzuki |
| 4,790,294 A | 12/1988 | Allred, III et al. |
| 4,790,624 A | 12/1988 | Van Hoye |
| 4,826,087 A | 5/1989 | Chinery |
| 4,846,573 A | 7/1989 | Taylor |
| 4,890,602 A | 1/1990 | Hake |
| 4,911,206 A | 3/1990 | Gropp et al. |
| 4,972,048 A | 11/1990 | Martin |
| 4,991,565 A | 2/1991 | Takahashi |
| 5,090,205 A | 2/1992 | Foster |
| 5,102,221 A | 4/1992 | Desgranges |
| 5,203,646 A | 4/1993 | Landsberger |
| 5,254,809 A | 10/1993 | Martin |
| 5,271,382 A | 12/1993 | Chikama |
| 5,323,962 A | 6/1994 | Jassby |
| 5,337,733 A | 8/1994 | Bauerfeind |
| 5,339,845 A | 8/1994 | Huddas |
| 5,372,162 A | 12/1994 | Frey |
| 5,385,102 A | 1/1995 | Villedieu |
| 5,390,402 A | 2/1995 | White |
| 5,399,164 A | 3/1995 | Snoke |
| 5,408,970 A | 4/1995 | Burkhard |
| 5,482,029 A | 1/1996 | Sekiguchi |
| 5,501,156 A | 3/1996 | Richter |
| 5,644,394 A | 7/1997 | Owens |
| 5,667,023 A | 9/1997 | Harrell |
| 5,787,897 A | 8/1998 | Kieturakis |
| 5,807,241 A | 9/1998 | Heimberger |
| 5,816,769 A | 10/1998 | Bauer et al. |
| 6,123,273 A | 9/2000 | Loprinzo |
| 6,156,974 A | 12/2000 | Blase |
| 6,213,974 B1 | 4/2001 | Smith |
| 6,216,439 B1 | 4/2001 | Nakamoto |
| 6,287,206 B1 | 9/2001 | Stage |
| 6,311,704 B1 | 11/2001 | Foster |
| 6,371,148 B1 | 4/2002 | Tripp |
| 6,431,824 B2 | 8/2002 | Schotsch |
| 6,432,046 B1 | 8/2002 | Yarush |
| 6,478,033 B1 | 11/2002 | Foster |
| 6,481,195 B1 | 11/2002 | Blase |
| 6,542,230 B1 | 4/2003 | Luke |
| 6,643,877 B1 | 11/2003 | Amtenbrink |
| 6,698,456 B2 | 3/2004 | Neubauer |
| 6,783,491 B2 | 8/2004 | Saadat |
| 6,837,846 B2 | 1/2005 | Jaffe |
| 6,941,974 B2 | 9/2005 | Utaki |
| 6,943,570 B2 | 9/2005 | Duffy |
| 6,955,023 B2 | 10/2005 | Rothcroc |
| 6,957,781 B2 | 10/2005 | Gowens et al. |
| 6,974,411 B2 | 12/2005 | Belson |
| 7,150,416 B2 | 12/2006 | Martin et al. |
| 7,171,279 B2 | 1/2007 | Buckingham |
| 7,182,024 B2 | 2/2007 | Pfeiffer |
| 7,182,025 B2 | 2/2007 | Ghorbel |
| 7,185,407 B2 | 3/2007 | Boyl-Davis |
| 7,258,521 B2 | 8/2007 | Guerra |
| 7,509,735 B2 | 3/2009 | Philip |
| 7,559,340 B2 | 7/2009 | Ikeda et al. |
| 7,571,735 B2 | 8/2009 | Wagner |
| 7,677,181 B2 | 3/2010 | Boyl-Davis |
| 7,703,272 B2 | 4/2010 | Wagner et al. |
| 7,707,704 B2 | 5/2010 | Crocker |
| 7,712,301 B1 | 5/2010 | Wagner |
| 7,718,894 B2 | 5/2010 | Blase |
| 7,741,563 B2 | 6/2010 | Harada et al. |
| 7,849,878 B2 | 12/2010 | Kohler et al. |
| 7,854,109 B2 | 12/2010 | Zubiate |
| 7,883,674 B2 | 2/2011 | Huang |
| 8,096,030 B2 | 1/2012 | Graichen |
| 8,125,755 B2 | 2/2012 | Garcia |
| 8,152,934 B2 | 4/2012 | Lee et al. |
| 8,206,488 B2 | 6/2012 | Mantkowski |
| 8,303,243 B2 | 11/2012 | Fish et al. |
| 8,327,518 B2 | 12/2012 | Korner |
| 8,374,722 B2 | 2/2013 | Buckingham |
| 8,377,232 B2 | 2/2013 | Myers et al. |
| 8,400,501 B2 | 3/2013 | Heyworth |
| 8,409,248 B2 | 4/2013 | Ginn |
| 8,453,533 B2 | 6/2013 | Ryland |
| 8,505,204 B2 | 8/2013 | Reverchon |
| 8,571,711 B2 | 10/2013 | Jacobsen et al. |
| 8,635,849 B2 | 1/2014 | Tassone et al. |
| 8,674,222 B2 | 3/2014 | Hsieh |
| 8,714,038 B2 | 5/2014 | Moran |
| 8,758,232 B2 | 6/2014 | Graham et al. |
| 8,920,579 B2 | 12/2014 | Liedtke |
| 8,945,096 B2 | 2/2015 | Zubiate |
| 8,959,902 B2 | 2/2015 | Olivier et al. |
| 8,991,163 B2 | 3/2015 | Olivier |
| 8,992,421 B2 | 3/2015 | Stand |
| 8,998,567 B2 | 4/2015 | Scipio et al. |
| 9,016,159 B2 | 4/2015 | Kell et al. |
| 9,016,293 B2 | 4/2015 | Battaglioli et al. |
| 9,028,618 B2 | 5/2015 | Battaglioli et al. |
| 9,127,234 B2 | 9/2015 | Hughes et al. |
| 9,149,929 B2 | 10/2015 | Motzer |
| 9,187,700 B2 | 11/2015 | Huang et al. |
| 9,220,398 B2 | 12/2015 | Woodley |
| 9,263,866 B2 | 2/2016 | Shimizu |
| 9,294,737 B2 | 3/2016 | Hatcher, Jr. |
| 9,329,377 B2 | 5/2016 | Kell |
| 9,399,299 B2 | 7/2016 | Hermey |
| 9,403,244 B2 | 8/2016 | Rautenberg |
| 9,409,292 B2 | 8/2016 | Smith |
| 9,435,750 B2 | 9/2016 | Matsumoto |
| 9,458,735 B1 | 10/2016 | Diwinsky |
| 9,492,906 B2 | 11/2016 | Rosing et al. |
| 9,505,125 B2 | 11/2016 | Zubiate |
| 9,549,663 B2 | 1/2017 | Larkin |
| 9,733,195 B2 | 8/2017 | Colletti |
| 9,778,141 B2 | 10/2017 | Bancalari |
| 9,788,141 B2 | 10/2017 | Ponec |
| 9,857,002 B2 | 1/2018 | Ott et al. |
| 9,902,024 B2 | 2/2018 | Ernst |
| 9,909,694 B2 | 3/2018 | Graham et al. |
| 9,951,647 B2 | 4/2018 | Rawson |
| 10,060,569 B2 | 8/2018 | Sivacoe |
| 10,085,624 B2 | 10/2018 | Isoda |
| 10,197,473 B2 | 2/2019 | Scott |
| 10,213,919 B2 | 2/2019 | Axinte |
| 10,238,457 B2 | 3/2019 | Herrell |
| 10,265,810 B2 | 4/2019 | Scott |
| 10,428,993 B2 | 10/2019 | Whitefield |
| 10,470,831 B2 | 11/2019 | Cohen |
| 10,884,232 B1* | 1/2021 | Trivedi .............. G02B 23/2492 |
| 10,926,403 B1* | 2/2021 | Asokan ................ B25J 15/0052 |
| 10,962,345 B2 | 3/2021 | Graham |
| 10,967,504 B2* | 4/2021 | Simaan .................... B25J 9/161 |
| 11,371,437 B2 | 6/2022 | Hawke |
| 11,413,763 B2 | 8/2022 | Lee |
| 2003/0171736 A1 | 9/2003 | Bon |
| 2003/0229420 A1 | 12/2003 | Buckingham |
| 2004/0138525 A1 | 7/2004 | Saadat |
| 2004/0186350 A1 | 9/2004 | Brenneman |
| 2004/0249367 A1 | 12/2004 | Saadat |
| 2004/0255422 A1 | 12/2004 | Reback |

(56) References Cited

U.S. PATENT DOCUMENTS

| | | |
|---|---|---|
| 2005/0075538 A1 | 4/2005 | Banik |
| 2005/0107667 A1 | 5/2005 | Danitz |
| 2005/0124856 A1 | 6/2005 | Fujikura |
| 2005/0148287 A1 | 7/2005 | Moeller |
| 2005/0203340 A1 | 9/2005 | Butler |
| 2005/0204489 A1 | 9/2005 | Velez, Jr. |
| 2005/0273085 A1 | 12/2005 | Hinman |
| 2006/0073348 A1 | 4/2006 | Farmer et al. |
| 2006/0074283 A1 | 4/2006 | Henderson |
| 2006/0074383 A1 | 4/2006 | Boulais |
| 2006/0131908 A1 | 6/2006 | Tadano |
| 2006/0156851 A1 | 7/2006 | Jacobsen |
| 2006/0170386 A1 | 8/2006 | Anhalt |
| 2006/0258265 A1 | 11/2006 | Moeller |
| 2008/0066821 A1 | 3/2008 | Komiya et al. |
| 2008/0149141 A1 | 6/2008 | Sales |
| 2008/0161971 A1 | 7/2008 | Buckingham |
| 2008/0199304 A1 | 8/2008 | Moran |
| 2008/0250769 A1 | 10/2008 | Wagner et al. |
| 2009/0084108 A1 | 4/2009 | Prociw et al. |
| 2009/0084408 A1 | 4/2009 | Thiemann |
| 2009/0084411 A1 | 4/2009 | Woodcock et al. |
| 2009/0216245 A1 | 8/2009 | Viola |
| 2009/0255102 A1 | 10/2009 | McMasters et al. |
| 2009/0255116 A1 | 10/2009 | McMasters et al. |
| 2009/0256007 A1 | 10/2009 | McMasters et al. |
| 2009/0320891 A1 | 12/2009 | Liedtke |
| 2010/0030377 A1 | 2/2010 | Unsworth |
| 2010/0037924 A1 | 2/2010 | Gebhardt et al. |
| 2010/0108107 A1 | 5/2010 | Mantkowski |
| 2010/0116292 A1 | 5/2010 | Wagner |
| 2010/0147330 A1 | 6/2010 | Kohler et al. |
| 2010/0160736 A1 | 6/2010 | Padget |
| 2010/0234988 A1 | 9/2010 | Buckingham |
| 2010/0256447 A1 | 10/2010 | Dubi |
| 2011/0174108 A1 | 7/2011 | Graham |
| 2011/0303053 A1 | 12/2011 | Schneider |
| 2011/0313243 A1 | 12/2011 | Zubiate |
| 2012/0067158 A1* | 3/2012 | Kell ............... B25J 18/06 74/490.04 |
| 2012/0125164 A1 | 5/2012 | Kozak |
| 2012/0167547 A1 | 7/2012 | Zhang et al. |
| 2012/0184817 A1 | 7/2012 | Sugiyama |
| 2012/0197241 A1 | 8/2012 | Golden |
| 2012/0260497 A1 | 10/2012 | White |
| 2012/0312103 A1 | 12/2012 | Hannott |
| 2013/0074879 A1 | 3/2013 | Battaglioli et al. |
| 2013/0125753 A1 | 5/2013 | Ono et al. |
| 2013/0192353 A1 | 8/2013 | Hatcher |
| 2013/0199040 A1 | 8/2013 | Matthias |
| 2013/0226033 A1 | 8/2013 | Eskuri |
| 2013/0255410 A1 | 10/2013 | Lee |
| 2013/0335530 A1 | 12/2013 | Hatcher, Jr. |
| 2013/0340559 A1 | 12/2013 | Danitz |
| 2014/0005683 A1 | 1/2014 | Stand |
| 2014/0012288 A1 | 1/2014 | Darisse |
| 2014/0055596 A1 | 2/2014 | Hatcher, Jr. |
| 2014/0125791 A1 | 5/2014 | Arellano |
| 2014/0260755 A1 | 9/2014 | Dong |
| 2015/0036150 A1 | 2/2015 | Kobayashi |
| 2015/0064008 A1 | 3/2015 | Lewis |
| 2015/0159557 A1 | 6/2015 | Scipio et al. |
| 2015/0233263 A1 | 8/2015 | Battaglioli et al. |
| 2015/0246449 A1 | 9/2015 | Sakai |
| 2015/0300920 A1 | 10/2015 | Deascanis |
| 2015/0338353 A1 | 11/2015 | Bancalari |
| 2015/0341600 A1 | 11/2015 | Hatcher, Jr. |
| 2015/0360629 A1 | 12/2015 | Sekino |
| 2016/0032761 A1 | 2/2016 | Griffiths et al. |
| 2016/0040803 A1 | 2/2016 | Steeger |
| 2016/0146036 A1 | 5/2016 | Richter |
| 2016/0174816 A1 | 6/2016 | Choset |
| 2016/0186602 A1 | 6/2016 | Saenz |
| 2016/0262840 A1 | 9/2016 | Zubiate |
| 2016/0339584 A1 | 11/2016 | Esteban Finck |
| 2017/0023154 A1 | 1/2017 | Jaeker |
| 2017/0095922 A1 | 4/2017 | Licht |
| 2017/0100197 A1 | 4/2017 | Zubiate |
| 2017/0129110 A1 | 5/2017 | Ohm |
| 2017/0167289 A1 | 6/2017 | Diwinsky |
| 2017/0167953 A1 | 6/2017 | Diwinsky |
| 2017/0175569 A1 | 6/2017 | Rawson |
| 2017/0191376 A1 | 7/2017 | Eriksen et al. |
| 2017/0219814 A1 | 8/2017 | Letter |
| 2017/0219815 A1 | 8/2017 | Letter |
| 2017/0239762 A1 | 8/2017 | Roberts |
| 2017/0274484 A1 | 9/2017 | Roberts |
| 2017/0319048 A1 | 11/2017 | Ikeda |
| 2017/0328497 A1 | 11/2017 | Dantin |
| 2017/0361470 A1 | 12/2017 | Otero Del Real |
| 2018/0058233 A1 | 3/2018 | Norton |
| 2018/0094538 A1 | 4/2018 | Tibbetts et al. |
| 2018/0119568 A1 | 5/2018 | Negoescu |
| 2018/0149038 A1 | 5/2018 | Eriksen |
| 2018/0156062 A1 | 6/2018 | Dede |
| 2018/0156132 A1 | 6/2018 | Dede |
| 2018/0231162 A1 | 8/2018 | Zeng |
| 2018/0313225 A1 | 11/2018 | Millhaem et al. |
| 2018/0361960 A1 | 12/2018 | Yamamoto |
| 2019/0022877 A1 | 1/2019 | Akin |
| 2019/0046010 A1 | 2/2019 | Ryo |
| 2019/0054638 A1 | 2/2019 | Norton |
| 2019/0190190 A1 | 6/2019 | Bourgeas |
| 2019/0246878 A1 | 8/2019 | Bodner |
| 2019/0277770 A1 | 9/2019 | Mekala |
| 2019/0308319 A1 | 10/2019 | Walters |
| 2019/0358833 A1* | 11/2019 | Graham .............. G05B 19/4099 |
| 2019/0360794 A1 | 11/2019 | Graham |
| 2019/0366536 A1 | 12/2019 | Graham |
| 2019/0383158 A1 | 12/2019 | Diwinsky |
| 2019/0383161 A1 | 12/2019 | Graham |
| 2020/0113412 A1 | 4/2020 | Jensen |
| 2020/0114497 A1 | 4/2020 | Graham |
| 2020/0114528 A1* | 4/2020 | Graham ................ B25J 9/1045 |
| 2020/0224552 A1 | 7/2020 | Millhaem |
| 2020/0316789 A1 | 10/2020 | Sohmshetty |
| 2020/0319119 A1 | 10/2020 | Peters |
| 2020/0359879 A1 | 11/2020 | Cahill |
| 2020/0405142 A1 | 12/2020 | Whitaker |
| 2021/0078165 A1 | 3/2021 | Tang |
| 2021/0102870 A1 | 4/2021 | Trivedi |
| 2021/0137354 A1 | 5/2021 | Bob |
| 2021/0223142 A1 | 7/2021 | Sasaki |
| 2021/0229269 A1* | 7/2021 | Graham ................ F01D 25/285 |
| 2021/0229270 A1* | 7/2021 | Graham .................. B25J 18/06 |
| 2021/0231239 A1* | 7/2021 | Graham ................ B25J 9/1045 |
| 2021/0285374 A1 | 9/2021 | Hawke |
| 2021/0388737 A1 | 12/2021 | Foxall |
| 2022/0221706 A1 | 7/2022 | Trivedi |
| 2022/0221707 A1 | 7/2022 | Trivedi |
| 2022/0290608 A1 | 9/2022 | Hawke |
| 2022/0314430 A1 | 10/2022 | Graham |
| 2023/0194234 A1 | 6/2023 | Graham |

FOREIGN PATENT DOCUMENTS

| | | |
|---|---|---|
| CA | 3043720 A1 | 11/2019 |
| CN | 1050781 C | 3/2000 |
| CN | 1656312 | 8/2005 |
| CN | 101528111 A | 9/2009 |
| CN | 101881218 | 11/2010 |
| CN | 201800016 | 4/2011 |
| CN | 102292013 A | 12/2011 |
| CN | 102711585 | 10/2012 |
| CN | 203370761 U | 1/2014 |
| CN | 103895012 A | 7/2014 |
| CN | 104582909 A | 4/2015 |
| CN | 103639156 B | 7/2015 |
| CN | 105436127 A | 3/2016 |
| CN | 106163431 | 11/2016 |
| CN | 106427289 A | 2/2017 |
| CN | 106659438 | 5/2017 |
| CN | 106988798 | 7/2017 |
| CN | 107468339 A | 12/2017 |

(56) References Cited

FOREIGN PATENT DOCUMENTS

| | | |
|---|---|---|
| CN | 108472025 | 8/2018 |
| CN | 109068938 | 12/2018 |
| CN | 110001286 | 7/2019 |
| DE | 29902753 U | 6/1999 |
| DE | 102019002892 A1 | 10/2020 |
| DE | 102020106508 | 9/2021 |
| EP | 1216797 A1 | 6/2002 |
| EP | 1489269 A2 | 12/2004 |
| EP | 1574675 A2 | 9/2005 |
| EP | 2011619 A2 | 1/2009 |
| EP | 1914010 A3 | 9/2010 |
| EP | 2237931 A1 | 10/2010 |
| EP | 2267508 | 12/2010 |
| EP | 1967295 B1 | 1/2011 |
| EP | 2320262 | 5/2011 |
| EP | 2052792 A3 | 6/2011 |
| EP | 2353739 A1 | 8/2011 |
| EP | 2286933 B1 | 11/2011 |
| EP | 2275648 B1 | 3/2012 |
| EP | 1903188 B1 | 5/2013 |
| EP | 2597273 A2 | 5/2013 |
| EP | 2629655 | 8/2013 |
| EP | 3061923 A1 | 8/2016 |
| EP | 3072642 A2 | 9/2016 |
| EP | 1908928 B1 | 12/2016 |
| EP | 3153604 A1 | 4/2017 |
| EP | 3176365 A1 | 6/2017 |
| EP | 3572632 | 11/2019 |
| EP | 3572632 A1 | 11/2019 |
| EP | 3879075 | 9/2021 |
| FR | 2956608 A1 | 8/2011 |
| FR | 2995996 A1 | 3/2014 |
| FR | 3082136 A1 | 12/2019 |
| GB | 779248 | 7/1957 |
| GB | 1437405 A | 5/1976 |
| GB | 2199842 | 7/1988 |
| GB | 2228644 A | 8/1990 |
| JP | 2013510339 A | 3/2013 |
| MX | 2010013223 A1 | 12/2010 |
| WO | 0006336 A1 | 2/2000 |
| WO | 2009081164 A1 | 7/2009 |
| WO | 2011092891 | 8/2011 |
| WO | 2012042921 A1 | 4/2012 |
| WO | 2012054829 A2 | 4/2012 |
| WO | 2016063074 A2 | 4/2016 |
| WO | 2018001967 A1 | 1/2018 |
| WO | 2019076876 | 4/2019 |
| WO | 2019076876 A1 | 4/2019 |
| WO | 2019097688 | 5/2019 |
| WO | 2021040376 A1 | 3/2021 |

OTHER PUBLICATIONS

Mascarenas et al., "A Compliant Mechanism for Inspecting Extremely Confined Spaces" Smart Materials and Structures, vol. No: 26, pp. 1-16, Oct. 26, 2017.

Mascarenas, et al., A compliant mechanism for inspecting extremely confined spaces, Smart Materials and Structures, Oct. 26, 2017, vol. 26, pp. 1-16.

U.S. Appl. No. 16/577,331; Notice of Allowance and Fees Due (PTOL-85) dated Jul. 25, 2022; (pp. 1-5).

U.S. Appl. No. 16/696,025; Final Rejection dated Sep. 16, 2022; (pp. 1-34).

U.S. Appl. No. 16/735,191; Non-Final Rejection dated Aug. 3, 2022; (pp. 1-11).

U.S. Appl. No. 16/751,802; Final Rejection dated Jul. 28, 2022; (pp. 1-9).

U.S. Appl. No. 17/144,487; Non-Final Rejection dated Aug. 23, 2022; (pp. 1-6).

European Search Report Corresponding to EP Application No. 181694589 dated Aug. 21, 2018.

Huang et al., In-Situ Continuous Coke Deposit Removal by Catalytic Steam Gasification for Fuel-Cooled Thermal Management, Journal of Engineering for Gas Turbines and Power, vol. 134, Oct. 2012, 8 Pages.

Wickham et al., High Heat Flux Surface Coke Deposition and Removal Assessment, Technical Paper, Air Force Research Laboratory, Edwards AFB, Jan. 2015, California, 21 Pages.

U.S. Final Office Action from U.S. Appl. No. 15/986,958 dated Sep. 9, 2020, 10 pgs.

U.S. Non-Final Office Action from U.S. Appl. No. 15/986,958 dated Apr. 23, 2020, 12 pgs.

U.S. Notice of Allowance and Notice of Allowability, dated Nov. 18, 2020, from U.S. Appl. No. 15/986,958, 9 pgs.

U.S. Appl. No. 16/751,802; Non-Final Rejection dated Feb. 28, 2022; (pp. 1-12).

U.S. Appl. No. 16/750,743; Non-Final Rejection dated Apr. 27, 2022; (pp. 1-12).

U.S. Appl. No. 16/577,268; Non-Final Rejection dated Jan. 20, 2023; (pp. 1-29).

U.S. Appl. No. 16/577,331; Non-Final Rejection dated Jan. 19, 2022; (pp. 1-8).

U.S. Appl. No. 16/577,331; Notice of Allowance and Fees Due (PTOL-85) dated Nov. 7, 2022; (pp. 1-5).

U.S. Appl. No. 16/577,331; Notice of Allowance and Fees Due (PTOL-85) dated Nov. 7, 2022; (pp. 1-16).

U.S. Appl. No. 16/735,191; Notice of Allowance and Fees Due (PTOL-85) dated Dec. 8, 2022; (pp. 1-8).

U.S. Appl. No. 16/750,743; Final Rejection dated Nov. 7, 2022; (pp. 1-13).

U.S. Appl. No. 16/750,743; Final Rejection dated Nov. 7, 2022; (pp. 1-28).

U.S. Appl. No. 16/750,743; Notice of Allowance and Fees Due (PTOL-85) dated Jan. 23, 2023; (pp. 1-5).

U.S. Appl. No. 16/751,802; Notice of Allowance and Fees Due (PTOL-85) dated Feb. 6, 2023; (pp. 1-5).

U.S. Appl. No. 16/751,802; Notice of Allowance and Fees Due (PTOL-85) dated Oct. 19, 2022; (pp. 1-7).

U.S. Appl. No. 16/898,629; Non-Final Rejection dated Sep. 13, 2022; (pp. 1-14).

U.S. Appl. No. 17/144,487; Final Rejection dated Jan. 11, 2023; (pp. 1-5).

U.S. Appl. No. 17/219,577; Notice of Allowance and Fees Due (PTOL-85) dated Jan. 4, 2023; (pp. 1-5).

U.S. Appl. No. 16/751,802; Supplemental Notice of Allowance dated Feb. 27, 2023; (pp. 1-4).

U.S. Appl. No. 16/898,629; Final Rejection dated Feb. 28, 2023; (pp. 1-22).

U.S. Appl. No. 17/824,691; Notice of Allowance and Fees Due (PTOL-85) dated Jun. 21, 2023; (pp. 1-9).

U.S. Appl. No. 16/577,331; Notice of Allowance and Fees Due (PTOL-85) dated May 26, 2023; (pp. 1-5).

U.S. Appl. No. 16/696,025; Non-Final Rejection dated Mar. 28, 2023; (pp. 1-29).

U.S. Appl. No. 16/735,191; Notice of Allowance and Fees Due (PTOL-85) dated Mar. 27, 2023; (pp. 1-5).

U.S. Appl. No. 16/750,743; Notice of Allowance and Fees Due (PTOL-85) dated May 16, 2023; (pp. 1-5).

U.S. Appl. No. 16/898,629; Non-Final Rejection dated Jun. 7, 2023; (pp. 1-14).

U.S. Appl. No. 17/144,487; Non-Final Rejection dated Mar. 22, 2023; (pp. 1-6).

U.S. Appl. No. 17/144,487; Final Rejection dated Jul. 20, 2023; (pp. 1-7).

* cited by examiner

EXTENSION TOOL HAVING A PLURALITY OF LINKS

FIELD

The present subject matter relates generally to an extension tool having a plurality of links and one or more passages therethrough.

BACKGROUND

Robotic arm assemblies are useful throughout various industries for performing operations at, e.g., remote locations, hazardous locations, etc. At least certain robotic arm assemblies include a robotic arm formed of a plurality of links joined together at respective joints. Additionally, a plurality of control wires may extend through the robotic arm, with each wire terminating at an individual link for moving such link relative to an aft-adjacent link. The control wires may be coupled to one or more motors within a base of the robotic arm assembly, such that the robotic arm assembly may control a movement of the robotic arm by increasing and/or decreasing tension on the plurality of control wires.

In such a manner, robotic arms may be useful in reaching out-of-sight locations within various environments. However, robotic arms may generally be cost prohibitive and/or more complicated than desired for certain applications. Accordingly, a tool that may allow for a user to reach remote locations within an environment in a more cost efficient manner would be useful.

BRIEF DESCRIPTION

Aspects and advantages of the invention will be set forth in part in the following description, or may be obvious from the description, or may be learned through practice of the invention.

In one exemplary embodiment of the present disclosure, an extension tool is provided, the extension tool including a plurality of sequentially arranged links moveable to a first position, the plurality of sequentially arranged links rigidly fixed to one another in the first position, the plurality of sequentially arranged links defining a first passage and a second passage, the second passage being separate from the first passage when the plurality of sequentially arranged links are rigidly fixed to one another.

In one exemplary aspect of the present disclosure, a method for operating a selectively flexible extension tool including a plurality of sequentially arranged links defining a first fluid flow passage and a second fluid flow passage is provided. The method includes providing a first fluid flow through the first fluid flow passage; and providing a second fluid flow through the second fluid flow passage, the second fluid flow passage being separate from the first fluid flow passage when the plurality of sequentially arranged links are joined together.

For example, in certain other exemplary aspects the opening is a borescope opening. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
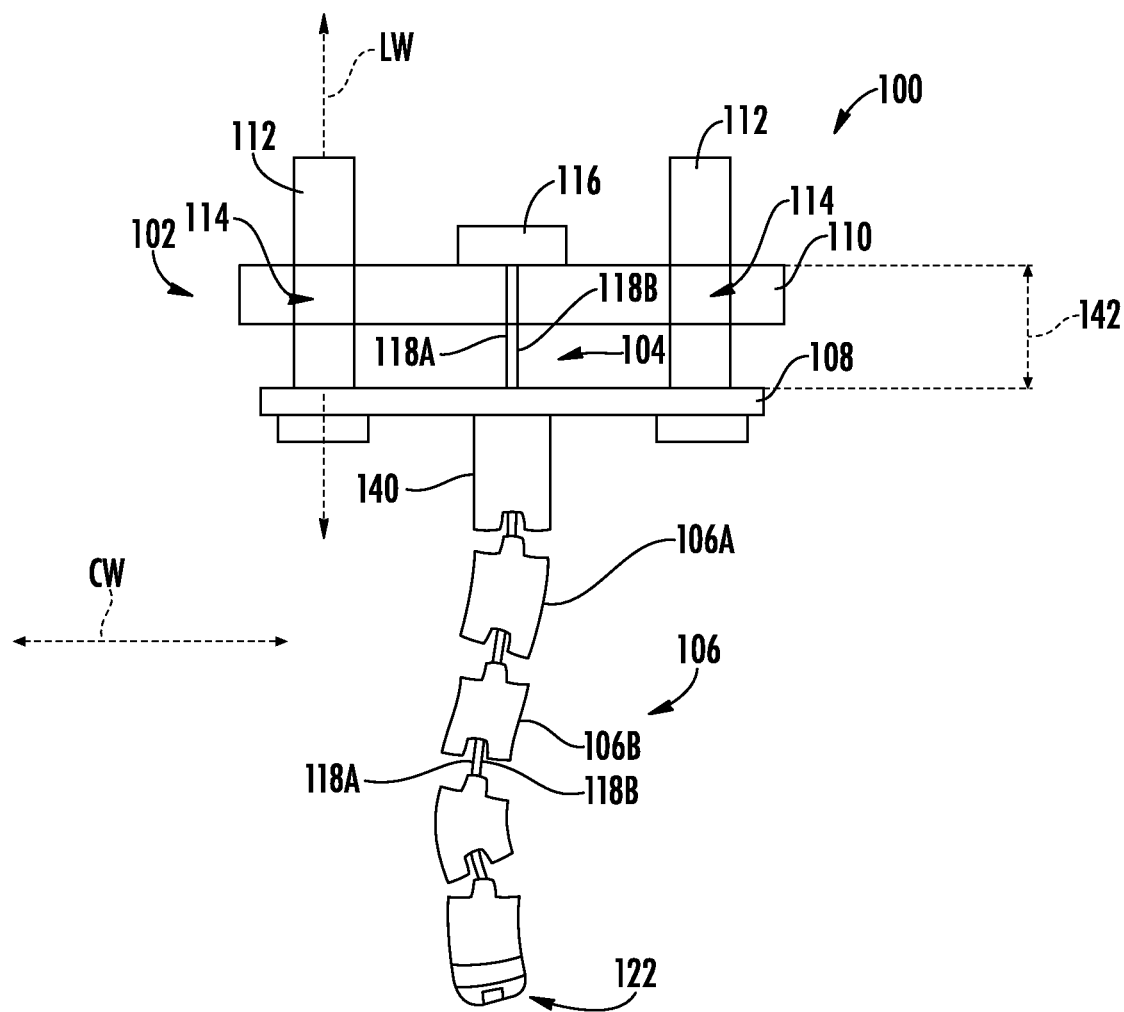
FIG. 1 is a schematic view of an extension tool in accordance with an exemplary embodiment of the present disclosure in a slacked position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions of a component or system, and refer to the normal operational attitude of the component or system. For example, with regard to an extension tool in accordance with one or more the present embodiments, forward refers to a position closer to a distal end of the extension tool and aft refers to a position closer to a root end of the extension tool.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
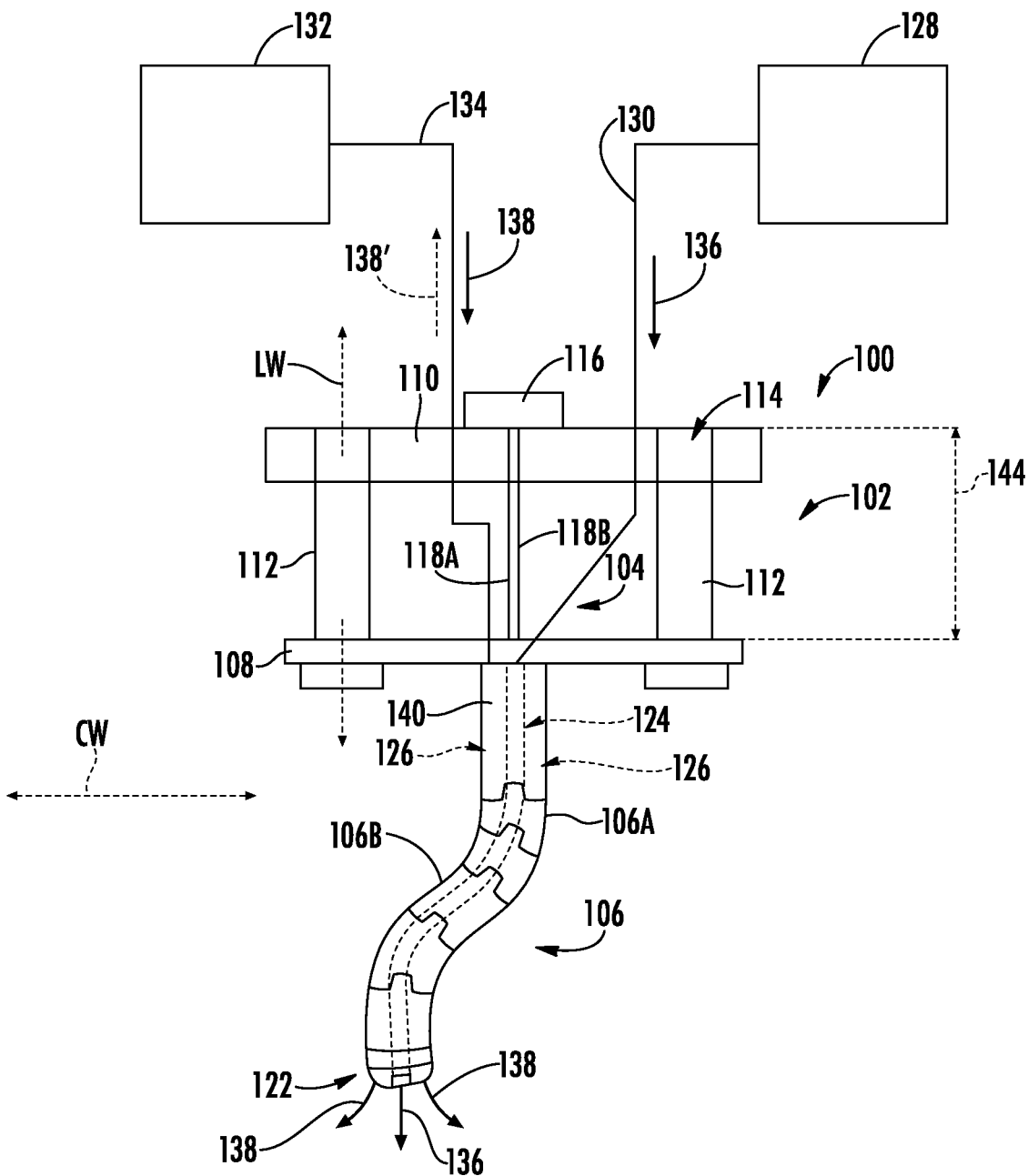
FIG. 2 is a schematic view of the exemplary extension tool of FIG. 1 in a tensioned position.

Referring now to the drawings, wherein identical numerals indicate the same elements throughout the Figs., FIG. 1 is a schematic view of an extension tool 100 in accordance with an exemplary embodiment of the present disclosure in a slacked position; and FIG. 2 is a schematic view of the exemplary extension tool 100 of FIG. 1 in a tensioned position. Accordingly, it will be appreciated from the description herein that the extension tool 100 is a selectively flexible extension tool.

The extension tool 100 generally includes a base 102, a line assembly 104, and a plurality of sequentially arranged links 106. The base 102 generally includes a first plate 108, a second plate 110, and one or more extension guides 112. For the embodiment depicted, the one or more extension guides 112 includes a pair of extension guides 112 fixedly coupled to the first plate 108 and extending in a lengthwise direction LW. The second plate 110 of the base 102 includes openings 114 corresponding to the pair of extension guides 112, such that the second plate 110 is slidable along the extension guides 112 in the lengthwise direction LW away from the first plate 108 and towards the first plate 108.

The line assembly 104 generally includes a root 116 coupled to the second plate 110 of the base 102 and a plurality of lines 118 extending from the root 116. The plurality of lines 118 includes a first line 118A and second line 118B. As will be appreciated from the discussion herein below, the line assembly 104, and in particular the first and second lines 118A, 118B, are operable with the plurality of sequentially arranged links 106 to move the plurality of sequentially arranged links 106 between the slacked position (FIG. 1) and the tensioned position (FIG. 2). Further, it will be appreciated that for the embodiment depicted, although the lines are depicted as being spaced from one another in a crosswise direction CW in the embodiment depicted for explanatory purposes, they are actually aligned with one another in the crosswise direction CW for the embodiment depicted.

As will be explained in greater detail below, the plurality of sequentially arranged links 106 are spaced from one another when in the slacked position (FIG. 1) to allow the plurality of sequentially arranged links 106 to pivotably move relative to one another. By contrast, the plurality of sequentially arranged links 106 are pressed against one another when in the tensioned position (FIG. 2) to rigidly fix the plurality of sequentially arranged links 106 to one another.

For the embodiment of FIGS. 1 and 2, it will be appreciated that each of the plurality of links 106 are designed to result in a specific rigidized shape when the plurality of links 106 are moved to the tensioned position. For example, a first link 106A of the plurality of links 106 defines a first geometry (i.e., length, curvature, etc.) and a second link 106B of the plurality of links 106 defines a second geometry (i.e., link, curvature, etc.). The first geometry is different than the second geometry. In at least certain exemplary embodiments, in order to form the plurality of links 106 having specific geometries to facilitate a desired shape of the plurality of links 106, each of the plurality of links 106 may be formed through an additive manufacturing process (sometimes also referred to as 3D printing). Such may facilitate the formation of specifically shaped links 106 to be fitted within the plurality of links 106 of an extension tool 100 resulting in a desired shape when moved to the tensioned position, yet still remaining flexible enough to fit through an anticipated environment.

Further, with regard to the plurality of lines 118 of the line assembly 104, it will be appreciated that each of these lines 118 may be configured as cables, ropes, threads, etc. Accordingly, it will be appreciated that the lines 118 are generally flexible (i.e., will not prevent the plurality of sequentially arranged links 106 from pivotably moving relative to one another in the slacked position). Further, one or more of the lines 118 may be formed of a metal material, such as a steel, tungsten, etc. Alternatively, however, the lines 118 may be formed of any other suitable material.

In at least certain exemplary embodiment, it will be appreciated that the extension tool 100 depicted in FIGS. 1 and 2 may include a tool implement coupled to one of the plurality of links 106. For example, the extension tool 100 defines a distal end 122, and the tool implement may be coupled to the link 106 at the distal end 122. In certain exemplary embodiment, the tool implement may include one or more sensors, cameras, or both, and additionally, or alternatively, may include one or more drills, laser tools, welding implements, rotatable implement (such as a Phillips head screwdriver bit, a flat head screwdriver bit, a Torx bit, Allen bit, Pozidrive, or the like), etc. In such a manner, the extension tool 100 may facilitate performing mechanical operations on a part at a remote location, or along an obscure vector within an environment (e.g., along a non-linear path within the environment) that would otherwise be more difficult.

With one or more of the configurations, the extension tool 100 may include a flexible driveshaft extending through an interior of the plurality of links 106, and more specifically, through a tube defined along a length of the plurality of links 106 (later described as a first passage).

It will further be appreciated, however, that in other embodiments, the extension tool 100 may be configured in any other manner to perform operations at a remote location, or along an obscure vector, within an environment.

Specifically, for the embodiment shown, the extension tool 100 is configured such that the plurality of sequentially arranged links 106 defines a passage therethrough when the plurality of sequentially arranged links 106 are in the tensioned position (FIG. 2).

More specifically, for the embodiment shown, the extension tool 100 is configured such that the plurality of sequentially arranged links 106 defines a passage therethrough when the plurality of sequentially arranged links 106 are in the tensioned position (FIG. 2). For the embodiment depicted, the passage is a fluid flow passage. However, in other embodiments, the passage may not be configured to provide a fluid flow and instead may be configured to, e.g., act as a guide tube for a tool.

It will be appreciated, that as used herein, the term "fluid flow passage" refers to any substantially continuous passage through the plurality of sequentially arranged links 106 when the plurality of sequentially arranged links 106 are in the tensioned position, capable of providing a gas or liquid flow to a location proximate the distal end 122 of the plurality of sequentially arranged links 106, or extracting a gas or liquid flow from a location proximate the distal end 122 of the plurality of sequentially arranged links 106.

More specifically, referring particular to FIG. 2, the plurality of sequentially arranged links 106 together define a first passage and a second passage, the second passage being separate from the first passage when the plurality of sequentially arranged links 106 are in the tensioned position. More specifically, still, for the embodiment shown, the first passage is a first fluid flow passage 124 and the second passage is a second fluid flow passage 126. However, as noted above, in other embodiments the first and/or second passage may not be configured to provide a fluid flow and instead may be configured to, e.g., act as a guide tube for a tool.

The second fluid flow passage 126 is separate from the first fluid flow passage 124 when the plurality of sequentially arranged links 106 are in the tensioned position. In such a manner, separate fluids may flow through the respective first and second fluid flow passages 124, 126. As will be appreciated from the description herein, and particularly from the embodiments described below, in at least certain exemplary embodiments, including the embodiment of FIG. 2, the first fluid flow passage 124 is an inner fluid flow passage and the second fluid flow passage 126 is an outer fluid flow passage. In such a manner, the inner fluid flow passage is positioned inward of the outer fluid flow passage, with the outer fluid flow passage substantially completely surrounding the inner fluid flow passage. As such, the outer fluid flow passage may define a generally annular shape surrounding the inner fluid flow passage.

However, in other exemplary embodiments, the first and second fluid flow passages 124, 126 may be arranged in any other suitable manner. For example, in other embodiments, the first and second fluid flow passages 124, 126 may instead run parallel and adjacent to one another, but may not be arranged concentrically (e.g., one of the first or second fluid flow passages 124, 126 extending along one side of the plurality of links 106 and the other of the first or second fluid flow passages 124, 126 extending along another side of the plurality of links 106).

Referring still to the exemplary embodiment of FIG. 2, the second fluid flow passage 126 is substantially fluidly isolated from the first fluid flow passage 124 when the plurality of sequentially arranged links 106 are in the tensioned position. As used herein, the term "substantially fluidly isolated" refers to less than 10% of a fluid provided to a respective one of the first fluid flow passage 124 or second fluid flow passage 126 transferring to the other of the first fluid flow passage 124 or second fluid flow passage 126 during normal operations, including the operations described herein.

Referring still particularly to FIG. 2, it will be appreciated that the extension tool 100 further includes features for providing one or more fluid flows through the first fluid flow passage 124, the second fluid flow passage 126, or both. For example, for the embodiment of FIG. 2, the extension tool 100 further includes a first fluid flow device 128 fluidly coupled to the first fluid flow passage 124, the second fluid flow passage 126, or both.

In particular, for the embodiment of FIG. 2 the first fluid flow device 128 is fluidly coupled to the first fluid flow passage 124 through a first conduit 130, and the extension tool 100 further includes a second fluid flow device 132 fluidly coupled to the second fluid flow passage 126 through a second conduit 134. In certain embodiments, such as the embodiment shown, the first fluid flow device 128 generally includes a first pressurized fluid source for providing a first pressurized fluid flow 136 (shown schematically through conduit 130) through the first fluid flow passage 124. The first pressurized fluid flow 136 may be, e.g., a heated gas flow, a pressurized gas flow, a heated liquid flow, a pressurized liquid flow, etc.

Further for the embodiment of FIG. 2, the second fluid flow device 132 similarly includes a second pressurized fluid source for providing a second pressurized fluid flow 138 (shown schematically through conduit 134) through the second fluid flow passage 126. The second pressurized fluid 138 flow may include a different fluid flow than the first fluid flow 136 (e.g., a different gas, different liquid), may operate at a different temperature and/or pressure, etc.

For example, in certain exemplary embodiments the first pressurized fluid flow 136 may be a heated gas flow operating at a first temperature (such as a first initial temperature as measured at a base end of the plurality of links 106) and the second pressurized fluid flow 138 may similarly be a heated gas flow operating at a second temperature (such as a second initial temperature as measured at a base end of the plurality of links 106). The second temperature may be less than the first temperature to reduce a thermal gradient on a component on which the first and second pressurized fluid flows 136, 138 are directed. Additionally, or alternatively, the second temperature may be set to, e.g., ensure a thermal expansion of the first line 118A and the second line 118B of the line assembly 104 matches a thermal expansion of the plurality of links 106 during operation, thereby reducing a tension on the first and second lines 118A, 118B.

It will be appreciated, however, that in other exemplary embodiments, the extension tool 100 may operate in any other suitable manner. For example, as is depicted in phantom in FIG. 2, and other exemplary embodiments, the second pressurized fluid source of the second fluid flow device 132 may instead be a fluid pump for urging a second pressurized fluid flow 138' from the second fluid flow passage 126 in a direction opposite the first fluid flow 136. With such a configuration, the extension tool 100 may, e.g., ensure any leakage of a first pressurized fluid flow 136 through the first fluid flow passage 124 (e.g., between adjacent links 106) is captured and not leaked into the environment, and/or, may operate to suction up excess of the first pressurized fluid flow 136 at the distal end 122 of the plurality of sequentially arranged links 106. For example, the first pressurized fluid flow 136 may be a flow of oil or other lubrication being provided to a particular location within an environment, and the extension tool 100 may operate the second fluid flow passage 126 as a vacuum to suction up excess oil/lubrication at the particular location within the environment and further to capture any leakage from the first fluid flow passage 124.

Additionally, or alternatively, the extension tool 100 may not include separate fluid flow devices for the first and second fluid flow passages 124, 126. Instead, the first and second fluid flow passages 124, 126 may be fed from the same fluid flow source (e.g., the first fluid flow source 128). The fluid provided may be a heated fluid. The result may still be a first fluid flow 136 at the distal end 122 at a first temperature greater than a second temperature of a second fluid flow 138. Such may result from the second fluid flow effectively insulating the first fluid flow 136 and exchanging heat with the environment.

Referring again to both FIGS. 1 and 2, it will be appreciated that the line assembly 104 is operable with the plurality of sequentially arranged links 106 to move the plurality of sequentially arranged links 106 between the slacked position (FIG. 1) and tensioned position (FIG. 2). Specifically, the first line 118A and second line 118B of the line assembly 104 may be fixed to the link 106 at the distal end 122 of the plurality of sequentially arranged links 106. When the first line 118A and second line 118B of the line assembly 104 are tensioned (i.e., an amount of slack is taken out of the first and second lines 118A, 118B), a tension in the first line 118A and second line 118B presses each of the plurality of sequentially arranged links 106 against one another, fixing the plurality of sequentially arranged links 106 in position to form a substantially rigid extension. Notably, for the embodiment show, the plurality of links 106 includes a base link 140 fixed to the base 102, allowing the first and second lines 118A, 118B to be pulled tight.

As will be appreciated more fully from the discussion below, it will be appreciated that the first line 118A defines a first displacement when the plurality of sequentially arranged links 106 are moved from the slacked position to the tensioned position (i.e., the amount of slack taken out of the first line 118A), and similarly, the second line 118B defines a second displacement when the plurality of sequentially arranged links 106 are moved from the slacked position to the tensioned position (i.e., the amount of slack taken out of the second line 118B). More particularly, the first and second displacement may be measured by subtracting a first length 142 of the lines 118A, 118B between the plurality of links 106 and the root 116 (FIG. 1) when the links 106 are in the slacked position from a second length 144 of the lines 118A, 118B between the plurality of links 106 and the root 116 (FIG. 2) when the links 106 are in the tensioned position.

For the embodiment shown, the first displacement is substantially equal to the second displacement. For example, in at least certain exemplary embodiments, the first displacement may be within a 5% margin based on a value of the first displacement, or more specifically may be within a 2% margin of the second displacement based on the value of the first displacement.

As will also be appreciated more fully below, the substantially equal displacements of the first line 118A and the second line 118B are accomplished at least in part due to a positioning of a plurality of line guides (see, e.g., FIGS. 7 and 8) within the plurality of sequentially arranged links 106. In particular, the line guides facilitate each pair of adjacent links 106 pivotably moving relative to one another about a pivot reference line with the first line 118A and second line 118B positioned along the pivot reference line at a respective end of the link 106. For example, for the embodiment of FIGS. 1 and 2, the plurality of sequentially arranged links 106 form a non-linear shape when moved to the tensioned position, and more specifically, define a two-dimensional, nonlinear shape in the plane depicted (i.e., in a plane defined by the lengthwise direction LW and the crosswise direction CW). Each of the adjacent pair of sequentially arranged links 106 is configured to pivot about a respective pivot reference line perpendicular to the plane depicted in FIG. 1, and the first and second reference lines 118 at the respective ends of the respective links 106 along the respective pivot reference line. Such is described in more detail below.

Briefly, it will be appreciated that the term "pivot reference line" generally refers to a reference line about which one link most easily pivots relative to another link during normal operation.

Figure 3:
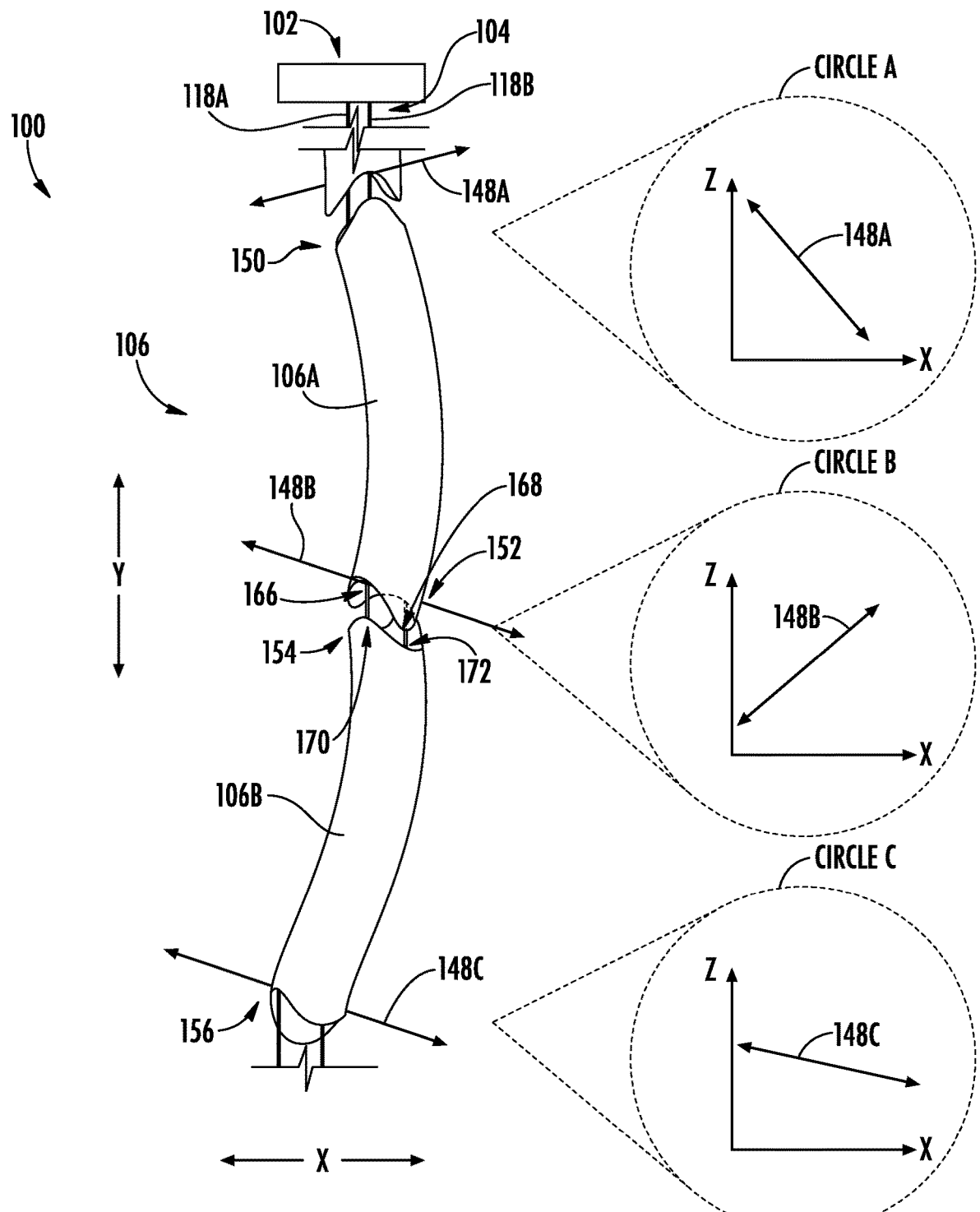
FIG. 3 is a schematic, cross sectional view of an extension tool in accordance with another exemplary embodiment of the present disclosure in a slacked position.
Figure 4:
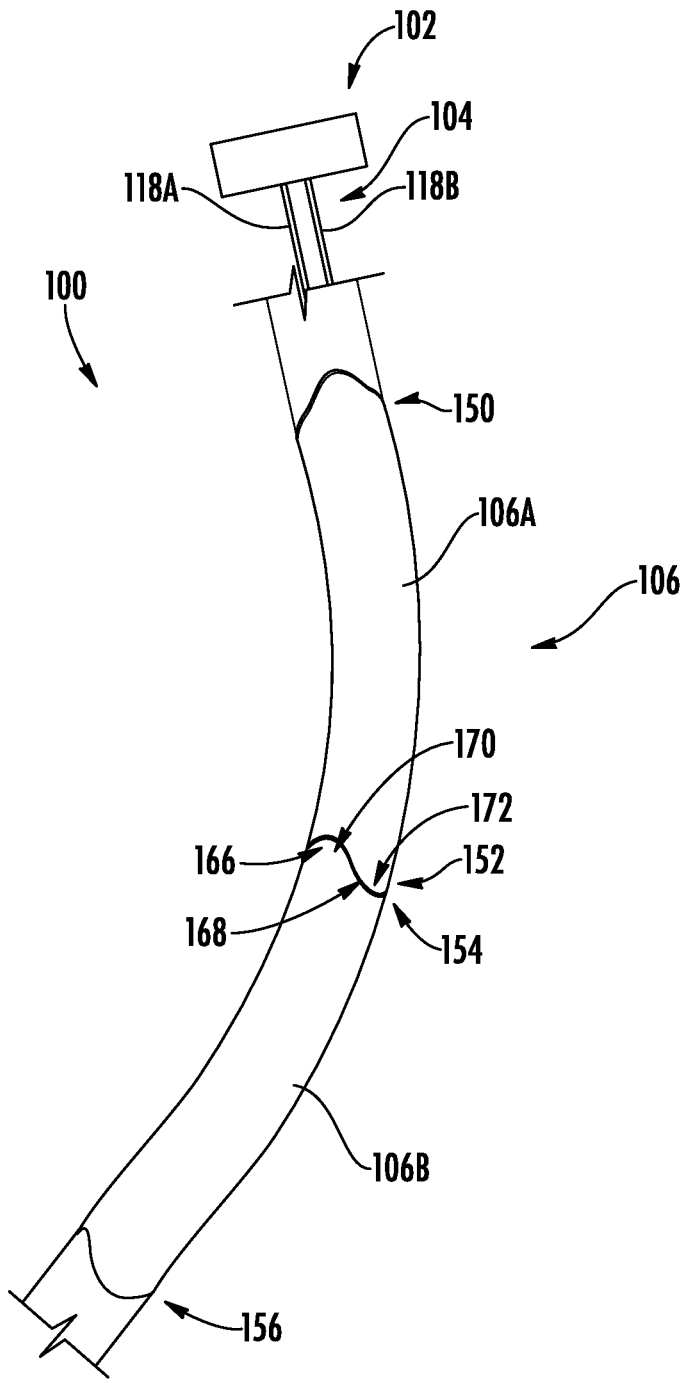
FIG. 4 is a schematic, close-up view of the exemplary extension tool of FIG. 3 in a tensioned position.

Referring now to FIGS. 3 and 4, an extension tool 100 in accordance with another exemplary embodiment of the present disclosure is provided. FIG. 3 depicts the exemplary extension tool 100 in a slacked position and FIG. 4 depicts the exemplary extension tool 100 in a tensioned position. The exemplary extension tool 100 may be configured in a similar manner as exemplary extension tool 100 described above with reference to FIGS. 1 and 2. For example, the exemplary extension tool 100 of FIGS. 3 and 4 generally includes a plurality of sequentially arranged links 106, as well as a line assembly 104 having a first line 118A and a second line 118B operable with the plurality of sequentially arranged links 106 to move the plurality of sequentially arranged links 106 between the slacked position (FIG. 3) and the tensioned position (FIG. 4).

As with the embodiment of FIGS. 1 and 2, for the embodiment of FIGS. 3 and 4, the first line 118A defines a first displacement when the plurality of sequentially arranged links 106 are moved from the slacked position (FIG. 3) and the tensioned position (FIG. 4) and the second line 118B defines a second displacement when the plurality of sequentially arranged links 106 are moved from the slacked position (FIG. 3) and the tensioned position (FIG. 4). The first displacement is substantially equal to the second displacement.

As noted above, such may be accomplished at least in part due to a positioning of the lines 118 at the ends of the respective links 106. For example, for the embodiment shown, the plurality of sequentially arranged links 106 generally includes a first link 106A and a second link 106B spaced from one another when in the slacked position to allow the second link 106B to pivotably move relative to the first link 106A about a pivot reference line 148. The first line 118A and the second line 118B of the line assembly 104 are positioned along the pivot reference line 148 at an end of the first link 106A proximate to the second link 106B.

More specifically, the first link 106A extends between a first end 150 and a second end 152, and similarly, the second link 106B extends between a first end 154 (located proximate the second end 152 of the first link 106A) and a second end 156. For the embodiment depicted, the plurality of sequentially arranged links 106 form a nonlinear shape when moved to the tensioned position, and more specifically, define a three-dimensional, nonlinear shape when moved to the tensioned position (FIG. 4).

As such, the first link 106A defines a first pivot reference line 148A at the first end 150 of the first link 106A and a second pivot reference line 148B at the second end 152 of the first link 106A (or more particularly, the first link 106A defines the second pivot reference line 148B at the second end 152 of the first link 106A with the first end 154 of the second link 106B). The first pivot reference line 148A is out of plane with the second pivot reference line 148B. More specifically, the exemplary extension tool 100 defines an X direction, a Y direction, and a Z direction collectively forming an orthogonal coordinate system. As depicted in FIG. 3, the first pivot reference line 148A and second pivot reference line 148B are nonparallel in the X-Y plane, and as shown in callout circles A and B, are similarly nonparallel in the X-Z plane.

Further, referring still to FIG. 3, it will be appreciated that the second link 106B also defines pivot reference lines 148. Specifically, as briefly noted above, the second link 106B defines the second pivot reference line 148B at its first end 154 along with the second end 152 of the first link 106A, and the second link 106B further defines a third pivot line 118 at its second end 156. The third pivot line 118 is similarly out of plane with the first pivot line 118 and the second pivot line 118 (see, also, callout Circle C).

Notably, the pivot lines 118 refer to an imaginary reference line generally about which one link 106 pivots relative to another link 106 during normal operations when in the slacked position. The pivot reference lines 118 may be set by a shape of the adjacent links 106 and gravitational forces when held out in the slacked position, and may in some cases be influenced by the positioning of the first and second lines 118A, 118B.

Further, with the embodiment depicted, the first line 118A and the second line 118B of the line assembly 104 are generally arranged along pivot lines 118 at a respective end of a respective link 106. As will be shown more clearly in the Figures below, each of the plurality of links 106 includes one or more line guides for holding the plurality of lines 118 of the line assembly 104 in position.

Figure 5:
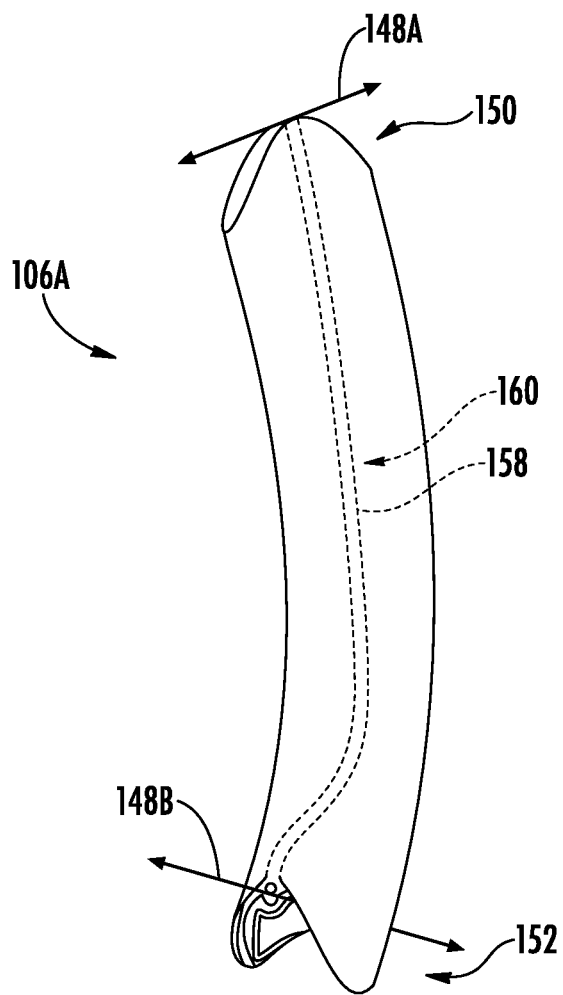
FIG. 5 is a first side view of a first link of the exemplary extension tool of FIG. 3.
Figure 6:
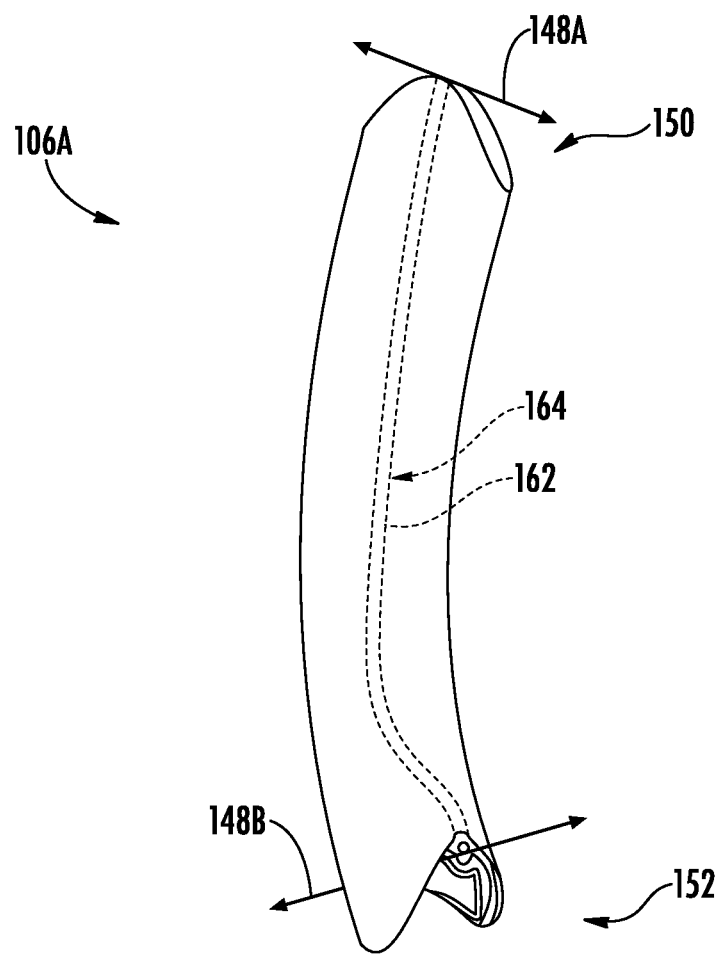
FIG. 6 is a second side view of the first link of the exemplary extension tool of FIG. 3.

For example, referring to FIGS. 5 and 6, close-up views of the first link 106A are provided. Specifically, FIG. 5 provides a first side view of the first link 106A and FIG. 6 provides a second side view of the first link 106A. Notably, the first side view of FIG. 5 is the same view depicted in FIGS. 3 and 4.

As shown, the first link 106A generally includes a wall 156 extending between the first end 150 and the second end 152, with the wall 156 forming a segment 158 of a first line guide 160 (FIG. 5; depicted in phantom) and a segment 162 of a second line guide 164 (FIG. 6; also depicted in phantom). The first line 118A of the line assembly 104 extends through the first line guide 160 and the second line 118B of the line assembly 104 extends through the second line guide 164. The first line guide 160 and the second line guide 164 are arranged along the first pivot reference line 148A at the first end 150 of the first link 106A, and similarly, the first line guide 160 and the second line guide 164 are arranged along the second pivot reference line 148B at the second end 152 of the first link 106A.

Referring still to FIGS. 5 and 6, it will be appreciated that the segment 158 of the first line guide 160 through the first link 106A extends in a serpentine path between the first end 150 of the first link 106A and second end 152 of the first link 106A relative to a geometry of the first link 106A. Notably, as used herein, the term "serpentine path" relative to a geometry of a particular link refers to a path having a shape different than a shape of the link (as may be determined by, e.g., a centerline of the link).

Additionally, the segment 162 of the second line guide 164 through the first link 106A extends in a serpentine path between the first end 150 of the first link 106A and the second end 152 of the first link 106A relative to the geometry of the first link 106A. Further, for the embodiment shown, the shape of the segment 158 of the first line guide 160 through the first link 106A is different than the shape of the segment 162 of the second line guide 164 through first link 106A.

Further still, it will be appreciated from FIGS. 3 through 6 collectively, that the second end 152 of the first link 106A defines a first mating geometry and the first end 154 of the second link 106B defines a second mating geometry (see, e.g., FIG. 3). The second mating geometry is complementary in shape to the first mating geometry to fully constrain the first link 106A relative to the second link 106B when the plurality of sequentially arranged links 106 are moved to the tensioned position. In such a manner, the plurality of lines 118 of the line assembly 104 are not required to align each adjacent link 106 relative to one another, and instead are simply utilized for providing a necessary tension between adjacent links 106. Such may prevent or minimize kinks, knots, twists, etc. within the lines 118 of the line assembly 104 during operation.

For the embodiment depicted, the first mating geometry at the second end 152 of the first link 106A includes a pair of concave curves 166 alternating with a pair of convex curves 168, and the second mating geometry at the first end 154 of the second link 106B similarly includes a pair of convex curves 170 alternating with a pair of concave curves 172. Notably, for the embodiment shown, a height of a first of the concave curves 168 of the first mating geometry is equal to a height of a first of the convex curves 170 of the second mating geometry; a height of a second concave curve 166 of the first mating geometry is equal to a height of a second convex curve 170 of the second mating geometry; a height of a first convex 168 curve of the first mating geometry is equal to a height of a first concave curve 172 of the second mating geometry; and a height of a second convex curve 168 of the first mating geometry is equal to a height of a second concave curve 172 of the second mating geometry.

However, in other embodiments, the extension tool 100 may include links 106 having any other suitable geometry for mating and constraining adjacent links 106 in a tensioned position.

As was noted above, the plurality of sequentially arranged links 106 together form a first fluid flow passage 124 and a second fluid flow passage 126 that are separate from one another when the plurality of sequentially arranged links 106 are in a tensioned position.

Figure 7:
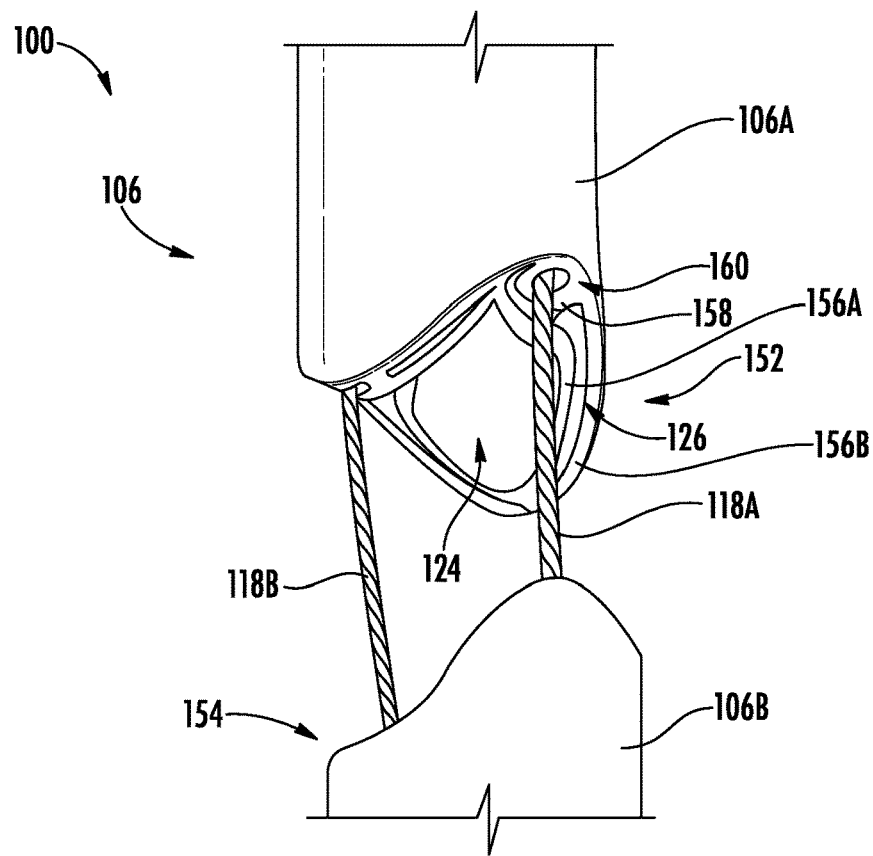
FIG. 7 is a close-up view of a junction between adjacent links of the extension tool depicted in FIG. 3.
Figure 8:
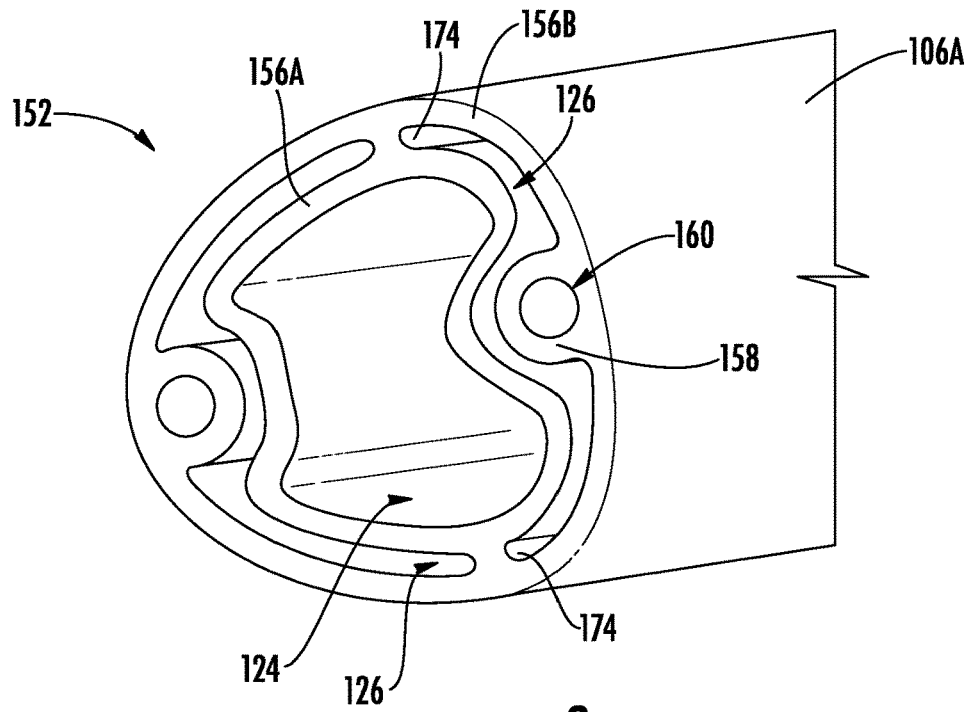
FIG. 8 is a close-up view of one end of one of the links of FIG. 7.

Referring now to FIGS. 7 and 8, such a configuration is described in greater detail. FIG. 7 depicts a close-up view of a junction between adjacent links 106 of the plurality of links 106 of the extension tool 100 depicted above in FIGS. 3 and 4, and FIG. 8 provides a close-up view of one end of one of the links 106 of FIG. 7.

As shown, a first link 106A in the plurality of sequentially arranged links 106 includes a wall 156. More specifically, for the embodiment shown, the first link 106A in the plurality of sequentially arranged links 106 includes a first wall 156A and a second wall 156B. The first wall 156A of the first link 106A defines in part a first fluid flow passage 124 and the second wall 156B of the first link 106A defines in part a second fluid flow passage 126. For the embodiment shown, the first wall 156A is an inner wall and the second wall 156B is an outer wall. The outer wall substantially completely surrounds the inner wall 156, such that the second fluid flow passage 126 is a generally annular passage surrounding the first fluid flow passage 124.

For the embodiment depicted, the second wall 156B is coupled to the first wall 156A through one or more point contacts 174 (see FIG. 8), such that the first and second wall 156A, 156B are not continuously connected along a length of each respective link 106. Specifically, for the embodiment shown, the one or more point contacts 174 are located at the ends of the links 106 (e.g., as first and second ends of each link 106). It will be appreciated that as used herein, the term "point contact" with reference to the connection between the first and second wall 156A, 156B of a respective link 106 refers to a connection that does not extend significantly along a length of the respective link, such as less than about 25% along a length of a respective link 106. For example, in certain exemplary embodiments, the point contacts 174 may extend less than about 15% along a length of a respective link 106, such as less than about 10% along a length of a respective link 106, such as less than about 5% along a length of a respective link 106. This embodiment represents an innovative solution to limit thermal conduction path from outer wall 156B to inner wall 156A by providing a narrow connection element (i.e., point contacts 174).

However, in other embodiments, the first wall 156A may be coupled to the second wall 156B in any suitable manner.

Further, as noted above, the plurality of sequentially arranged links 106 include a plurality of line guides for the plurality of lines 118 of the line assembly 104. In particular, for the embodiment shown, the line assembly 104 includes a first line 118A and a second line 118B, and the plurality of sequentially arranged links 106 similarly includes a first line guide 160 and a second line guide 164. Each link 106 includes a segment 158 of the first line guide 160 and segment 162 of the second line guide 164. For the embodiment shown, the line guides 160, 164 are positioned on an interior of the second wall 156B of each link 106 of the plurality of links 106.

It will be appreciated, however, that in other embodiments, the line guides may instead be located elsewhere, such as on an outside of the second wall 156B, on an outside of the first wall 156A, on an interior of the first wall 156A, or some combination thereof.

It will further be appreciated from the discussion above that for the embodiments depicted and described, adjacent links 106 are sealed together by including mating geometries at their respective ends that are complementary in shape with the mating geometries of the adjacent links. The walls 156 of the links 106 are pressed together and the contact pressure applied by the lines 118 form a contact seal therebetween to provide a seal between such links 106.

However, in certain embodiments, it may be desirable to provide a seal between adjacent links to provide a more air-tight, liquid-tight seal between adjacent links 106 (and therefore a more air-tight or liquid-tight fluid flow passage). For example, referring to FIGS. 9 to 11, three exemplary seal assemblies between a wall 156 of a first link 106A and a wall 156 of a second link 106B are provided.

Figure 9:
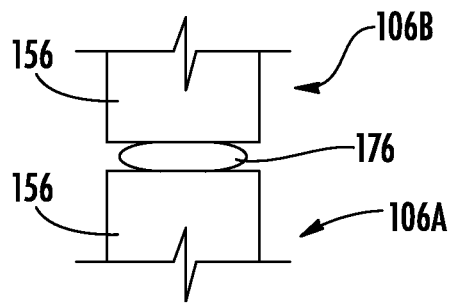
FIG. 9 is a seal between adjacent links of an extension tool in accordance with an exemplary embodiment of the present disclosure.

For the embodiment of FIG. 9, the seal assembly includes a gasket 176. The gasket 176 may be formed of any suitable material for the anticipated operations. For example, the gasket may be formed of an elastomeric material, a relatively flexible metal material, etc. The gasket 176 may be fixedly coupled to one of the wall 156 of the first link 106A or the wall 156 of the second link 106B.

Figure 10:
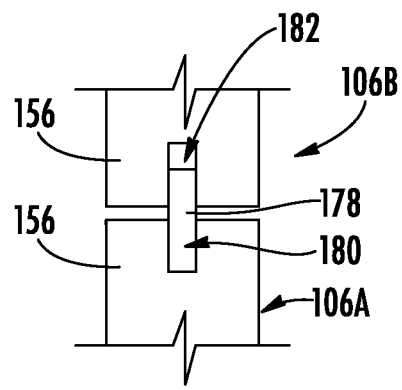
FIG. 10 is a seal between adjacent links of an extension tool in accordance with another exemplary embodiment of the present disclosure.

For the embodiment of FIG. 10, the seal includes a spline 178. For this embodiment, the wall 156 of the first link 106A includes a groove 180, with the spline positioned therein. Similarly, the wall 156 of the second link 106B includes a groove 182. When the first link 106 a and the second link 106B are moved to the tensioned position, the spline 178 is further positioned within the groove 182 of the second link 106B.

Figure 11:
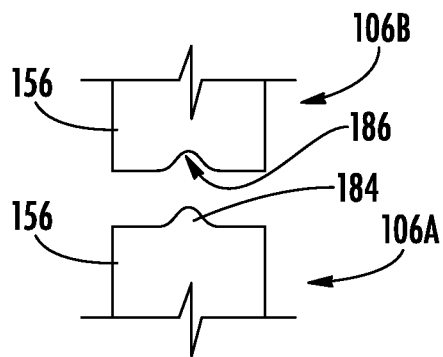
FIG. 11 is a seal between adjacent links of an extension tool in accordance with yet another exemplary embodiment of the present disclosure.

For the embodiment of FIG. 11, the seal includes a complementary mating geometry across a thickness of the wall 156 of the first link 106A and the wall 156 of the second link 106B. For example, for the embodiment shown, the 156 of the first link 106A includes a raised knob 184, and the wall 156 of the second link 106B includes a complementary groove 186.

It will be appreciated, however, that in other embodiments, any other suitable configuration may be provided for forming a seal between adjacent links 106.

Figure 12:
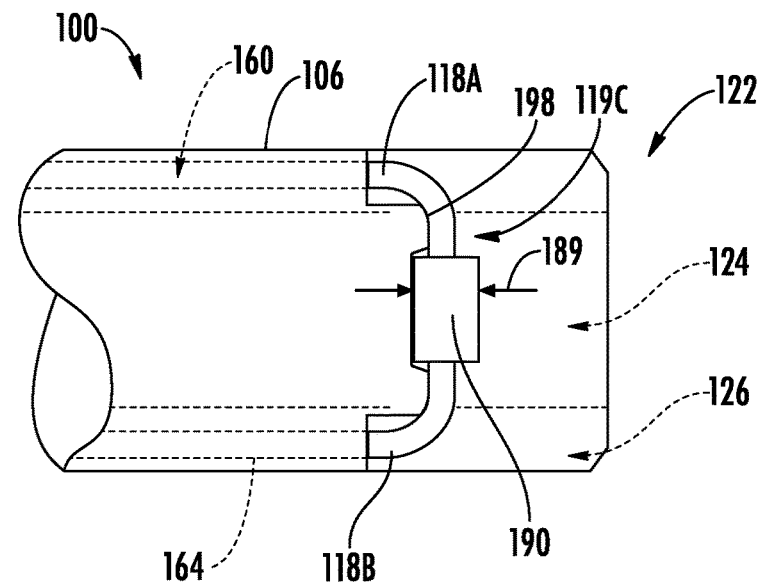
FIG. 12 a close-up, schematic view of a link of a plurality of links of an extension tool in accordance with an exemplary embodiment of the present disclosure.

Further, referring now to FIG. 12, a close-up, schematic view of a link 106 of a plurality of links 106 of an extension tool 100 is provided at a distal end 122 of the plurality of links 106 in accordance with an exemplary embodiment of the present disclosure. The link 106 depicted may be configured in accordance with one or more of the exemplary embodiments described above, or alternatively may be configured in accordance with any other suitable embodiment.

For the embodiment shown, the extension tool 100 includes a plurality of lines 118 extending along a length thereof, and more specifically includes a first line 118A and a second line 118B. Notably, however, for the embodiment shown, the first and second lines 118A, 118B are integral with one another at the distal end 122, such that the first line 118A meets the second line 118B at the distal end 122. In such a manner, the first and second lines 118A, 118B may in fact be a single line looped at the distal end 122. For this embodiment the lines 118 includes a transition portion 188 at the distal end 122 where the first line 118A loops around and transition into the second line 118B.

With such a configuration, in order to ensure both the first and second lines 118A, 118B do not completely pull out of the plurality of links 106 in the event of a failure of one of the first or second lines 118A, 118B, the extension tool 100 includes an attachment feature 190 coupled to the first line 118A, the second line 118, or both. More specifically, for the embodiment shown, the extension tool 100 includes the attachment feature 190 coupled to the transition portion 188 of the first and second lines 118A, 118B.

For the embodiment depicted, the attachment feature 190 defines a greater width 189 than the first and second lines 118A, 118B and is fixedly coupled to the transition portion 188 of the line 118. For example, the attachment feature 190 may be a crimp member, crimped onto the transition portion 188 of the lines 118. Alternatively, the attachment feature 190 may include a base with a screw or bolt extending to the line(s) 118 to fix the attachment feature 190 to the line(s) 118, a base welded, glued, epoxied, etc. to the line(s) 118, etc. In other embodiments, other configurations may be provided as well. Further, although a single attachment feature 190 is depicted, in other embodiments, multiple attachment features 190 may be provided.

More specifically, for the embodiment shown, the link 106 at the distal end includes support surfaces 198 to support the transition portion 188 of the line 118, such that a load on the attachment feature 190 may be minimized. In such a manner, the attachment feature 190 may effectively float between the support surfaces 198. However, in the event of a failure of one of the first or second lines 118A, 118B, the attachment feature 190 may be configured to abut against a respective line guide 160, 164 to prevent the line 118 remaining intact from sliding therethrough, allowing for the line 118 remaining intact to be used to remove the plurality of links 106 from the environment.

Figure 13:
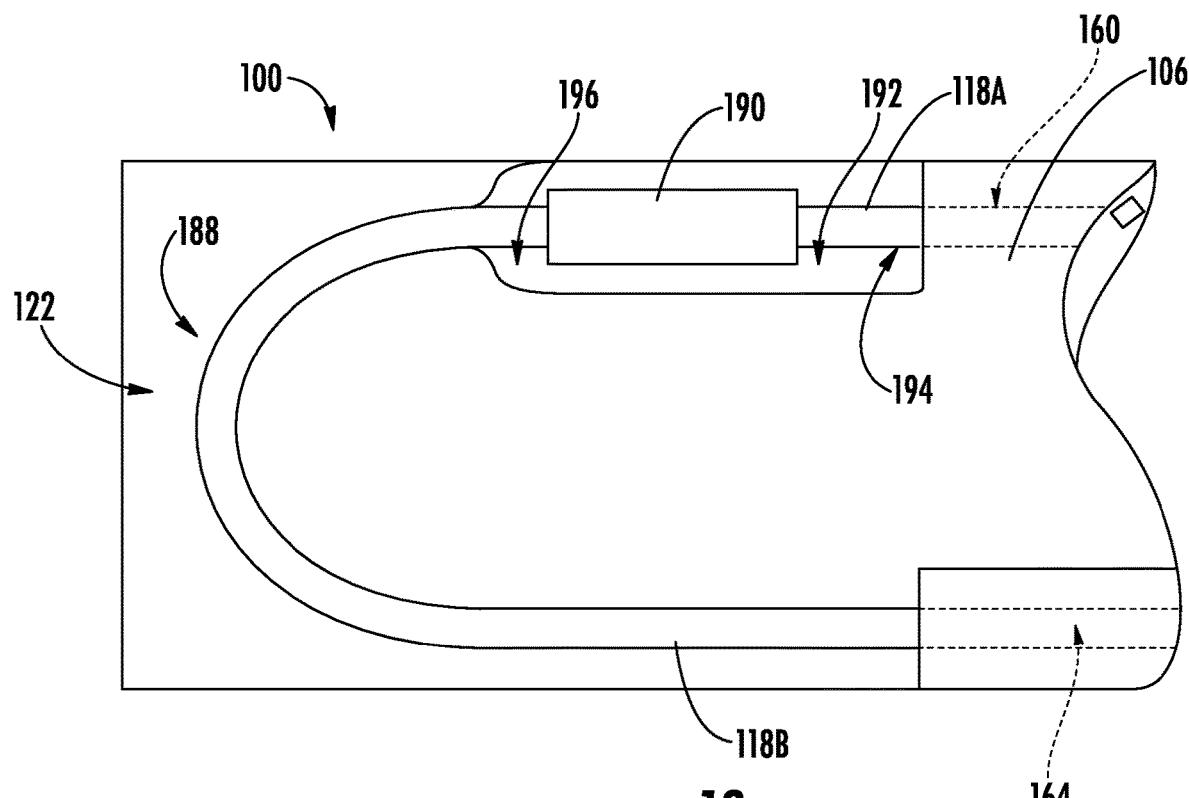
FIG. 13 a close-up, schematic view of a link of a plurality of links of an extension tool in accordance with another exemplary embodiment of the present disclosure.

Referring now to FIG. 13, another close-up, schematic view of a link 106 of a plurality of links 106 of an extension tool 100 is provided at a distal end 122 of the plurality of links 106 in accordance with an exemplary embodiment of the present disclosure. The link 106 depicted in FIG. 13 may be configured in a similar manner to the exemplary link 106 described above with respect to FIG. 12.

For example, the exemplary extension tool 100 depicted includes a first line 118A and a second line 118 formed integrally at a transition portion 188 at the distal end 122. The extension tool 100 further includes an attachment member 190. For the embodiment depicted, the attachment member 190 is attached to the first line 118A at the distal end 122. Notably, the link 106 at the distal end 122 defines an opening 192, with the first line 118A extending across the opening 192 and the attachment member 190 located within the opening 192. The opening defines a first shoulder 194 where the first line 118A enters across the opening 192 and a second shoulder 196 where the first line 118A exits across the opening 192. The attachment member 190 is positioned between the first and second shoulders 194, 196, without touching the first and second shoulders 194, 196 during normal operation.

In such a manner, the attachment member 190 is not under any significant load during normal operations (e.g., less than twenty-five percent of the total load on the first line 118A). However, in the event of a failure of the first line 118A or the second line 118B, the attachment member 190 may abut against a first shoulder 194 or a second shoulder 196 to prevent the line 118 remaining intact from sliding through the respective line guides 160, 164, allowing for the line 118 remaining intact to be used to remove the plurality of links 106 from the environment.

Further, referring now to FIG. 14, one exemplary application of the various extension tools 100 of the present disclosure will be described. Specifically, FIG. 14 depicts an extension tool 100 in accordance with an exemplary embodiment of the present disclosure being utilized to navigate through a nonlinear path within an environment, which for the embodiment shown is a gas turbine engine 200.

Figure 14:
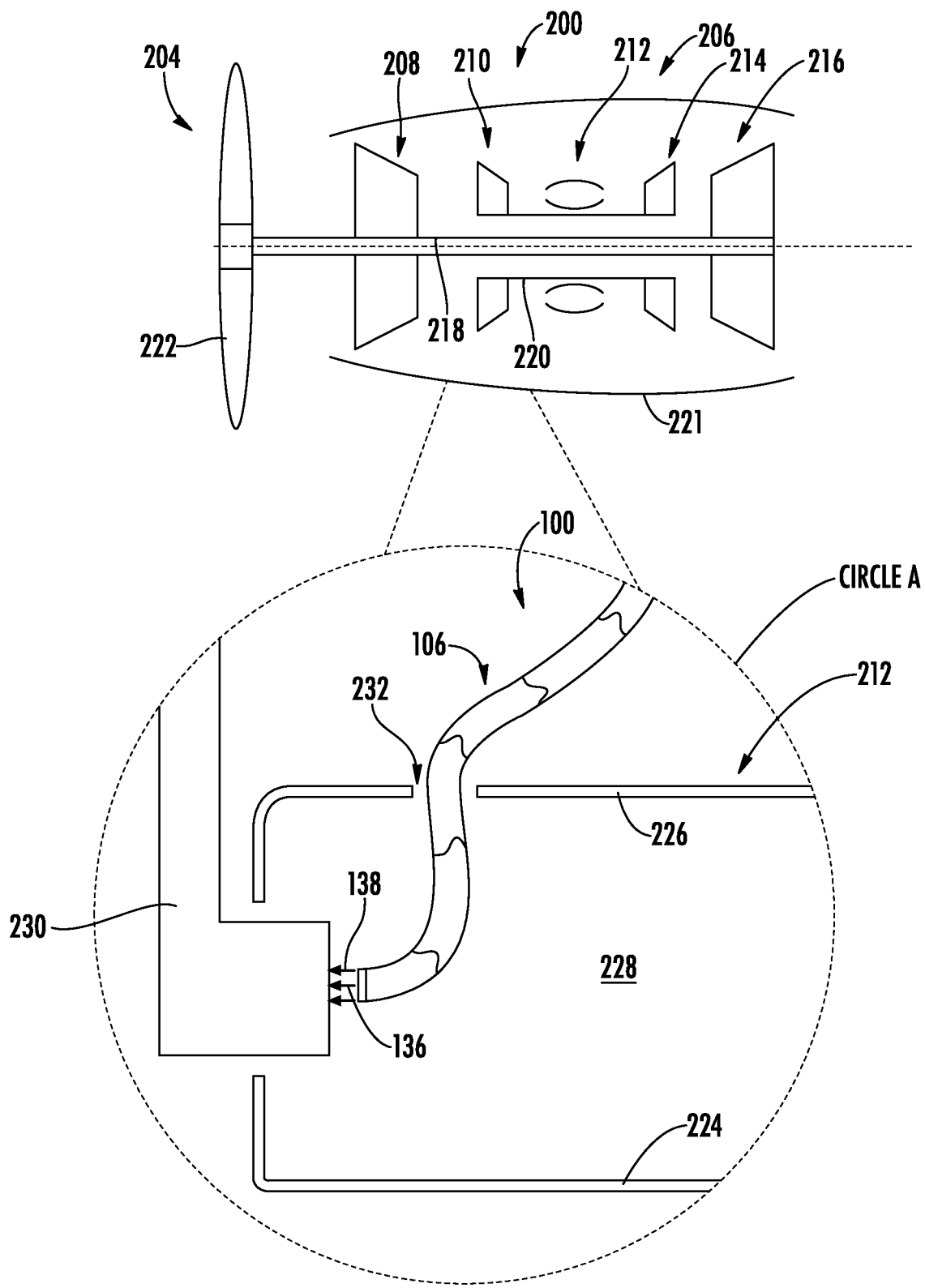
FIG. 14 is a schematic view of a gas turbine engine and extension tool in accordance with an exemplary embodiment of the present disclosure.

Specifically, for the embodiment of FIG. 14, the gas turbine engine 200 is configured as a turbofan engine. The turbofan engine generally includes a fan section 204 and a turbomachine 206.

The turbomachine 206 generally includes a compressor section having a low pressure ("LP") compressor 208 and a high pressure ("HP") compressor 210; a combustion section 212; a turbine section including an HP turbine 214 and an LP turbine 216; and an exhaust section (not shown). The compressor section, combustion section 212, turbine section, and exhaust section are each arranged in serial flow order. The LP compressor 208 and LP turbine 216 are coupled through an LP shaft 218, and similarly, the HP compressor 210 and HP turbine 214 are coupled to an HP shaft 220. Additionally, the turbomachine 26 includes a casing 221 enclosing at least in part the above-noted components of the turbomachine 206. Further, for the embodiment shown the fan section 204 includes a fan having a plurality of fan blades 222, with the fan and plurality of fan blades 222 being driven by the LP shaft 218.

In the callout Circle A, a close-up, schematic view of the combustion section 212 of the exemplary gas turbine engine 200 is provided. The combustion section 212 generally includes an inner liner 224 and an outer liner 226, together defining at least in part a combustion chamber 228. The combustion section 212 further includes a fuel nozzle 230 configured to provide, e.g., a mixture of fuel and compressed air to be combusted within the combustion chamber 228 during operation of the gas turbine engine 200. An igniter (not shown) may be positioned within an igniter hole 232 of the outer liner 226 for igniting the fuel and compressed air mixture.

After operating for an amount of time, an undesirable amount of coke buildup may form on or within the fuel nozzle 230. For example, during a shutdown of the gas turbine engine 200, fuel may remain within the fuel nozzle 230 and residual heat within the gas turbine engine 200 may cause the remaining fuel to coke. During, e.g., a maintenance interval, the extension tool 100 may be utilized to remove the buildup of coke on or within the fuel nozzle 230.

The exemplary extension tool 100 depicted may be configured in accordance with one or more of the exemplary embodiments described above with reference to FIGS. 1 through 13. For example, the exemplary extension tool may generally include a plurality of links 106 movable to a tensioned position (shown) having a nonlinear, two-dimensional or three-dimensional shape when in the tensioned position. Notably, the ability to additionally be moved to a slacked position may assist with moving the plurality of links 106 through the gas turbine engine 200 environment and through the igniter hole 232.

Further, the plurality of links 106 may together define a first fluid flow passage 124 (not shown) and a second fluid flow passage 126 (not shown). The extension tool 100 may be configured to provide a first gas flow 136 through the first fluid flow passage 124 and a second gas flow 138 through the second fluid flow passage 126. In order to remove the buildup of coke on or within the fuel nozzle 230, the first gas flow 136 may be a heated and pressurized gas flow defining a first operational temperature, and the second gas flow 138 may also be a heated and pressurized gas flow defining a second operational temperature. The first operational temperature may be sufficient to burn off the coke within the fuel nozzle 230. The second operational temperature may be less than the first operational temperature for heating to a lesser degree the area surrounding the coke buildup being burnt off to lessen a temperature gradient across the component.

Of course, in other embodiments, the extension tool 100 may be utilized for a myriad of different operations and functions.

Figure 15:
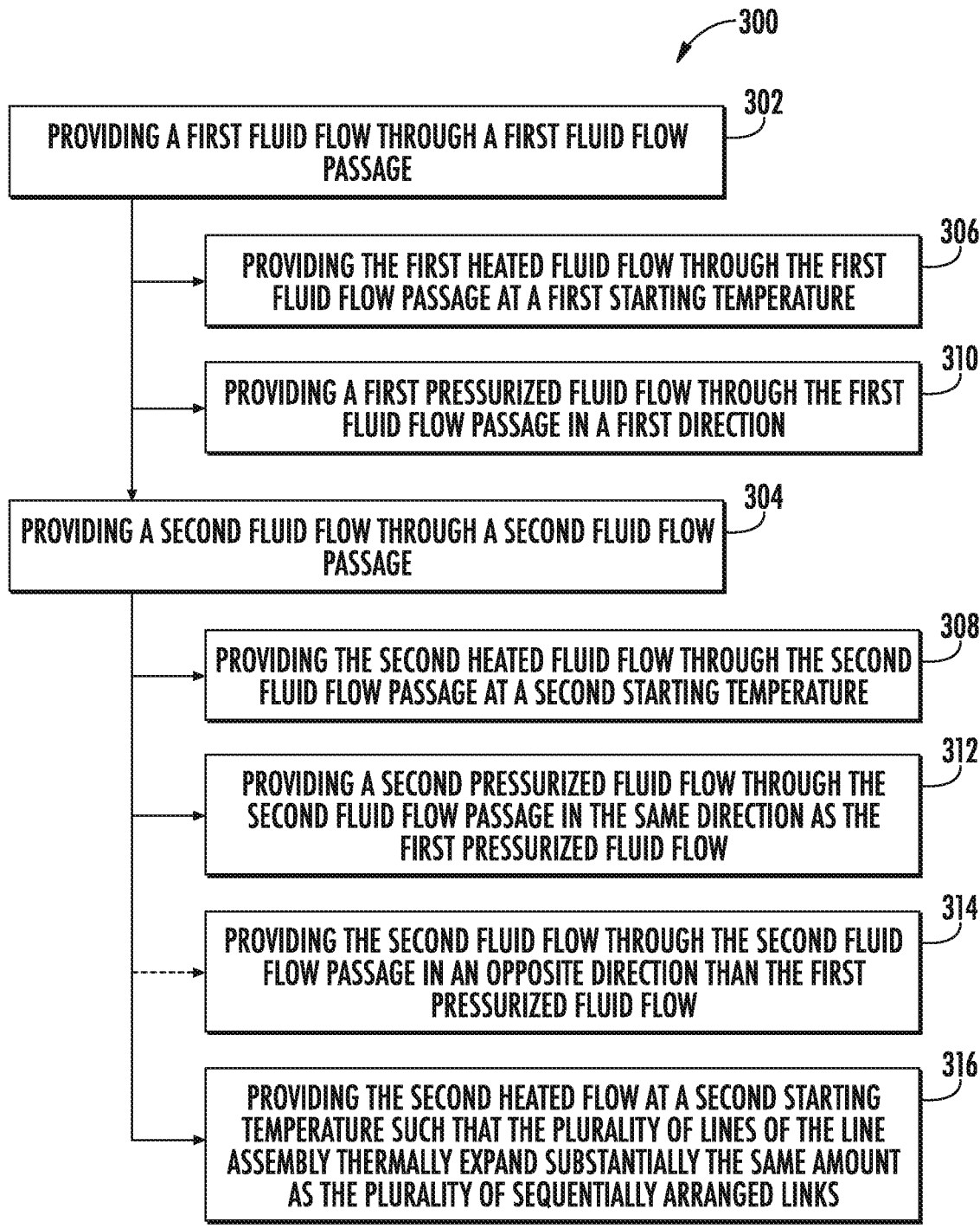
FIG. 15 is a flow diagram of a method for operating an extension tool in accordance with an exemplary aspect of the present disclosure.

Referring now to FIG. 15, a method 300 is provided for operating an extension tool within an environment. The method may utilize one or more of the exemplary extension tools described above with reference to FIGS. 1 through 13. Accordingly, for example, the extension tool may generally include a plurality of sequentially arranged links together defining a first fluid flow passage and a second fluid flow passage. However, in other embodiments, any other suitable extension tool may be utilized.

The method 300 generally includes at (302) providing a first fluid flow through a first fluid flow passage, and at (304) providing a second fluid flow through a second fluid flow passage. The second fluid flow passage is separate from the first fluid flow passage when the plurality of sequentially arranged links are joined together.

For example, in certain exemplary embodiments, the extension tool may be configured similar to the embodiments described above, such that the plurality of sequentially arranged links are movable between a slacked position and a tensioned position. With such an exemplary embodiment, the second fluid flow passage is separate from the first fluid flow passage when the plurality of sequentially arranged links are joined together by being moved to the tensioned position. Additionally, or alternatively, in certain exemplary embodiments, the second fluid flow passage may be substantially fluidly isolated from the first fluid flow passage when the plurality of sequentially arranged links are joined together by being moved to the tensioned position.

Referring still to FIG. 15, for the exemplary method 300 depicted, the first fluid flow is a first heated fluid flow and the second fluid flow is a second heated fluid flow. With such an exemplary embodiment, providing the first fluid flow through the first fluid flow passage at (302) includes at (306) providing the first heated fluid flow through the first fluid flow passage at a first starting temperature (i.e., a temperature of the fluid flow as it enters the first fluid flow passage), and providing the second fluid flow through the second fluid flow passage at (304) includes at (308) providing the second heated fluid flow through the second fluid flow passage at a second starting temperature. The first starting temperature may be greater than the second starting temperature, such as at least about 10% greater, such as at least about 25% greater, such as at least about 50% greater, such as at least about 75% greater, such as at least about 100% greater, such as up to 5000% greater, such as up to 1000% greater, such as up to 500% greater, such as up to 200% greater.

Further, with the exemplary aspect of the method 300 depicted in FIG. 15, providing the first fluid flow through the first fluid flow passage at (302) includes at (310) providing a first pressurized fluid flow through the first fluid flow passage in a first direction. The first direction may generally be from a base of the plurality of sequentially arranged links towards a distal end of the plurality of sequentially arranged links. Further, providing the second fluid flow through the second fluid flow passage at (304) includes at (312) providing a second pressurized fluid flow through the second fluid flow passage in the same direction as the first pressurized fluid flow (i.e., the first direction).

It will be appreciated, however, that in other exemplary aspects, providing the second fluid flow through the second fluid flow passage at (304) may alternatively include, as is depicted in phantom at (314) providing the second fluid flow through the second fluid flow passage in an opposite direction than the first pressurized fluid flow (e.g., a second direction, such as a direction extending generally from a distal end of the plurality of sequentially arranged links towards a base of the plurality of sequentially arranged links). With such an exemplary aspect, the extension tool may effectively utilize the second fluid flow passage as a vacuum.

Referring still to the exemplary aspect of the method 300 depicted, for the exemplary aspect depicted, the method 300 is configured to reduce undue stress on a plurality of lines operable with the plurality of links. For example, the plurality of lines may generally extend through a plurality of line guides positioned within, or thermally coupled to the second fluid flow passage. With such an exemplary aspect, providing the second fluid flow through the second fluid flow passage at (34) may further include at (316) providing the second heated flow at a second starting temperature such that the plurality of lines of the line assembly thermally expand substantially the same amount as the plurality of sequentially arranged links. For example, the plurality of lines may be formed of a metal, such as tungsten or a tungsten alloy, having a different coefficient of thermal expansion than a material forming the plurality of links. The heated fluid flow through the first fluid flow passage may define a starting temperature necessary for performing the desired operations (e.g., burning off coke from a fuel nozzle). The heated fluid flow through the second fluid flow passage may define a different starting temperature designed to thermally expand the plurality of lines substantially the same amount as expected thermal expansion of the plurality of sequentially arranged links due to the starting temperature the first fluid flow through the first fluid flow passage.

Although not depicted, additional selectively flexible tools may be utilized in additional exemplary aspects of the present disclosure.

Further aspects of the invention are provided by the subject matter of the following clauses:

An extension tool including a plurality of sequentially arranged links moveable to a first position, the plurality of sequentially arranged links rigidly fixed to one another in the first position, the plurality of sequentially arranged links defining a first passage and a second passage, the second passage being separate from the first passage when the plurality of sequentially arranged links are rigidly fixed to one another.

The extension tool of any preceding clause, further including a line assembly, wherein the line assembly is operable with the plurality of sequentially arranged links to move the plurality of sequentially arranged links between a slacked position and a tensioned position, wherein the plurality of sequentially arranged links are rigidly fixed to one another when in the tensioned position.

The extension tool of any preceding clause, wherein the second passage is substantially fluidly isolated from the first passage when the plurality of sequentially arranged links are rigidly fixed to one another.

The extension tool of any preceding clause, wherein the first passage is an inner passage, wherein the second passage is an outer passage, wherein the inner passage is positioned inward of the outer passage.

The extension tool of any preceding clause, wherein the first passage is a first fluid flow passage, wherein the second passage is a second fluid flow passage, and wherein the extension tool further includes: a first fluid flow device fluidly coupled to the first fluid flow passage, the second fluid flow passage, or both.

The extension tool of any preceding clause, wherein the first fluid flow device is fluidly coupled to the first fluid flow passage, and wherein the selectively flexible extension tool further includes: a second fluid flow device fluidly coupled to the second fluid flow passage.

The extension tool of any preceding clause, wherein the first fluid flow device comprises a first pressurized fluid source for providing a first pressurized fluid flow through the first fluid flow passage.

The extension tool of any preceding clause, wherein the second fluid flow device comprises a second pressurized fluid source for providing a second pressurized fluid flow through the second fluid flow passage.

The extension tool of any preceding clause, wherein the second fluid flow device comprises a fluid pump for urging a second pressurized fluid flow from the second fluid flow passage in a direction opposite of the first fluid flow.

The extension tool of any preceding clause, wherein a first link of the plurality of sequentially arranged links includes a first wall and a second wall, wherein the first wall of the first link defines in part the first passage, wherein the second wall of the first link defines in part the second passage, and wherein the second wall is coupled to the first wall through one or more point contacts.

The extension tool of any preceding clause, wherein the first wall is an inner wall, wherein the second wall is an outer wall, and wherein the outer wall completely surrounds the inner wall.

The extension tool of any preceding clause, further including: a line assembly, wherein the line assembly operable with the plurality of sequentially arranged links to move the plurality of sequentially arranged links between a slacked position and a tensioned position, wherein the second wall comprises a plurality of line guides, wherein the line assembly comprises a plurality of lines, and wherein each line of the plurality of lines of the line assembly extends through a respective line guide of the plurality of line guides.

The extension tool of any preceding clause, wherein the plurality of line guides of the second wall are positioned on an interior of the second wall.

The extension tool of any preceding clause, further including: a line assembly, wherein the line assembly is operable with the plurality of sequentially arranged links to move the plurality of sequentially arranged links between a slacked position and a tensioned position, the line assembly comprising a first line extending along a length of the plurality of sequentially arranged links to a distal end of the plurality of sequentially arranged links; a second line also extending along a length of the plurality of sequentially arranged links to the distal end of the plurality of sequentially arranged links, the first line being integral with the second line at the distal end; and an attachment feature attached the first line, the second line, or both.

The extension tool of any preceding clause, wherein the plurality of sequentially arranged links includes a distal link at the distal end, wherein the distal link defines an opening, and wherein the attachment feature is positioned within the opening.

A method for operating a selectively flexible extension tool comprising a plurality of sequentially arranged links defining a first fluid flow passage and a second fluid flow passage, the method including: providing a first fluid flow through the first fluid flow passage; and providing a second fluid flow through the second fluid flow passage, the second fluid flow passage being separate from the first fluid flow passage when the plurality of sequentially arranged links are joined together.

The method of any preceding clause, wherein the second fluid flow passage is separate from the first fluid flow passage when the plurality of sequentially arranged links are joined together by being moved to a tensioned position.

The method of any preceding clause, wherein the second fluid flow passage is substantially fluidly isolated from the first fluid flow passage when the plurality of sequentially arranged links are joined together by being moved to a tensioned position.

The method of any preceding clause, wherein providing the first fluid flow through the first fluid flow passage comprises providing a first heated fluid flow through the first fluid flow passage at a first starting temperature, wherein providing the second fluid flow through the second fluid flow passage comprises providing a second heated fluid flow through the second fluid flow passage a second starting temperature, and wherein the first starting temperature is greater than the second starting temperature.

The method of any preceding clause, wherein the selectively flexible extension tool further comprises a line assembly and a plurality of sequentially arranged links, wherein the line assembly is operable with the plurality of sequentially arranged links to move the plurality of sequentially arranged links between a slacked position and a tensioned position, wherein the second fluid flow is a second heated flow, and wherein providing the second fluid flow through the second fluid passage comprises providing the second heated flow at a second starting temperature such that a plurality of lines of the line assembly thermally expand substantially the same amount as the plurality of sequentially arranged links.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An extension tool comprising:
   a plurality of sequentially arranged links moveable to a first position, the plurality of sequentially arranged links rigidly fixed to one another in the first position, the plurality of sequentially arranged links defining a first passage and a second passage, the second passage being separate from the first passage when the plurality of sequentially arranged links are rigidly fixed to one another,
   wherein a first link of the plurality of sequentially arranged links includes a first wall and a second wall, wherein the first wall of the first link defines in part the first passage, wherein the second wall of the first link defines in part the second passage, and wherein the second wall is coupled to the first wall through one or more point contacts.

2. The extension tool of claim 1, further comprising:
   a line assembly, wherein the line assembly is operable with the plurality of sequentially arranged links to move the plurality of sequentially arranged links between a slacked position and a tensioned position, wherein the plurality of sequentially arranged links are rigidly fixed to one another when in the tensioned position.

3. The extension tool of claim 1, wherein the second passage is substantially fluidly isolated from the first passage when the plurality of sequentially arranged links are rigidly fixed to one another.

4. The extension tool of claim 1, wherein the first passage is an inner passage, wherein the second passage is an outer passage, wherein the inner passage is positioned inward from the outer passage.

5. The extension tool of claim 1, wherein the first passage is a first fluid flow passage, wherein the second passage is a second fluid flow passage, and wherein the extension tool further comprises:
   a first fluid flow device fluidly coupled to the first fluid flow passage, the second fluid flow passage, or both.

6. The extension tool of claim 5, wherein the first fluid flow device is fluidly coupled to the first fluid flow passage, and wherein the extension tool further comprises:
   a second fluid flow device fluidly coupled to the second fluid flow passage.

7. The extension tool of claim 6, wherein the first fluid flow device comprises a first pressurized fluid source for providing a first pressurized fluid flow through the first fluid flow passage.

8. The extension tool of claim 7, wherein the second fluid flow device comprises a second pressurized fluid source for providing a second pressurized fluid flow through the second fluid flow passage.

9. The extension tool of claim 8, wherein the second fluid flow device comprises a fluid pump for urging a second pressurized fluid flow from the second fluid flow passage in a direction opposite of the first pressurized fluid flow.

10. The extension tool of claim 1, wherein the first wall is an inner wall, wherein the second wall is an outer wall, and wherein the outer wall completely surrounds the inner wall.

11. The extension tool of claim 1, further comprising:
a line assembly, wherein the line assembly operable with the plurality of sequentially arranged links to move the plurality of sequentially arranged links between a slacked position and a tensioned position, wherein the second wall comprises a plurality of line guides, wherein the line assembly comprises a plurality of lines, and wherein each line of the plurality of lines of the line assembly extends through a respective line guide of the plurality of line guides.

12. The extension tool of claim 11, wherein the plurality of line guides of the second wall are positioned on an interior of the second wall.

13. The extension tool of claim 1, wherein the first wall is an inner wall, wherein the second wall is an outer wall, and wherein the inner wall is connected to the outer wall through one or more point contacts.

14. A method for operating a selectively flexible extension tool comprising a plurality of sequentially arranged links defining a first fluid flow passage and a second fluid flow passage, the method comprising:
providing a first fluid flow through the first fluid flow passage; and
providing a second fluid flow through the second fluid flow passage, the second fluid flow passage being separate from the first fluid flow passage when the plurality of sequentially arranged links are joined together,
wherein providing the first fluid flow through the first fluid flow passage comprises providing a first heated fluid flow through the first fluid flow passage at a first starting temperature, wherein providing the second fluid flow through the second fluid flow passage comprises providing a second heated fluid flow through the second fluid flow passage at a second starting temperature, and wherein the first starting temperature is greater than the second starting temperature.

15. The method of claim 14, wherein the second fluid flow passage is separate from the first fluid flow passage when the plurality of sequentially arranged links are joined together by being moved to a tensioned position.

16. The method of claim 14, wherein the second fluid flow passage is substantially fluidly isolated from the first fluid flow passage when the plurality of sequentially arranged links are joined together by being moved to a tensioned position.

17. The method of claim 14, wherein the selectively flexible extension tool further comprises a line assembly and a plurality of sequentially arranged links, wherein the line assembly is operable with the plurality of sequentially arranged links to move the plurality of sequentially arranged links between a slacked position and a tensioned position, wherein the second fluid flow is a second heated flow, and wherein providing the second fluid flow through a second fluid passage comprises providing the second heated flow at the second starting temperature such that a plurality of lines of the line assembly thermally expand substantially the same amount as the plurality of sequentially arranged links.

18. An extension tool comprising:
a plurality of sequentially arranged links moveable to a first position, the plurality of sequentially arranged links rigidly fixed to one another in the first position, the plurality of sequentially arranged links defining a first passage and a second passage, the second passage being separate from the first passage when the plurality of sequentially arranged links are rigidly fixed to one another; and
a line assembly, wherein the line assembly is operable with the plurality of sequentially arranged links to move the plurality of sequentially arranged links between a slacked position and a tensioned position, the line assembly comprising
a first line extending along a length of the plurality of sequentially arranged links to a distal end of the plurality of sequentially arranged links;
a second line also extending along a length of the plurality of sequentially arranged links to the distal end of the plurality of sequentially arranged links, the first line being integral with the second line at the distal end; and
an attachment feature attached to the first line, the second line, or both.

* * * * *